(12) United States Patent
Mosler et al.

(10) Patent No.: US 6,304,858 B1
(45) Date of Patent: Oct. 16, 2001

(54) METHOD, SYSTEM, AND COMPUTER PROGRAM PRODUCT FOR TRADING INTEREST RATE SWAPS

(75) Inventors: Warren B. Mosler, Hobe Sound; William P. McCauley; James M. Sherman, both of Delray Beach, all of FL (US)

(73) Assignee: Adams, Viner and Mosler, Ltd., West Palm Beach, FL (US)

( * ) Notice: Subject to any disclaimer, the term of this patent is extended or adjusted under 35 U.S.C. 154(b) by 0 days.

(21) Appl. No.: 09/209,746

(22) Filed: Dec. 11, 1998

Related U.S. Application Data

(60) Provisional application No. 60/104,400, filed on Oct. 15, 1998, provisional application No. 60/101,419, filed on Sep. 22, 1998, and provisional application No. 60/074,588, filed on Feb. 13, 1998.

(51) Int. Cl.[7] ......................................... G06F 17/60
(52) U.S. Cl. ................................. 705/37; 705/35
(58) Field of Search ........................................ 705/35, 37

(56) References Cited

U.S. PATENT DOCUMENTS

| | | |
|---|---|---|
| 4,642,768 | 2/1987 | Roberts . |
| 4,823,265 * | 4/1989 | Nelson .................................... 705/35 |
| 5,802,499 | 9/1998 | Sampson et al. . |
| 5,924,082 | 7/1999 | Silverman et al. . |
| 5,963,923 * | 10/1999 | Garber .................................... 705/37 |

FOREIGN PATENT DOCUMENTS 2-43667 * 2/1990 (JP) .

OTHER PUBLICATIONS

Lee, P., "Chicago Fights Back," Euromoney, Feb. 1993. pp. 18.*

Shiller, R.J., "Measuring Asset Values for Cash Settlement in Derivative Markets: Hedonic Repeated Measures Indices and Perpetual Futures," Journal of Finance, vol. 48, No. 3, p. 911, Jul. 1993.*

"Specialized Financial Applications. (Buyers Guide)," Wall Street & Technology, vol. 11, No. 8, p. 132, 1994.*

The Microsoft Press Computer Dictionary, Third Edition, Micrsoft Press, Redmond, 1997.*

"Repo Coming to Manage Rate Risk," CFO Alert, vol. 4, Issue 36, Sep. 22, 1997, pp. 1–2.

"A Packaged Repo Wrapped in Benchmark Financing," Bloomberg, Special Derivatives Section, Mar. 1997, pp. 63, 65, 67.

"Libor Financed Treasury Repo," Bloomberg, DG04n Equity LFRP, Feb. 4, 1998.

"LIFFELiborFinancedBond Futures Contract," LIFFE, <http://www.liffe.com/liffe/products/lfb.htm>, Sep. 15, 1998.

(List continued on next page.)

Primary Examiner—J. Miller
Assistant Examiner—Nicholas David Rosen
(74) Attorney, Agent, or Firm—Oblon, Spivak, McClelland, Maier & Neustadt, P.C.

(57) ABSTRACT

A method, system, computer program product, and data structure for trading in which a standardized contract is traded. The contract obligates a buyer and a seller to settle the contract based on a price of the contract at a first effective date. The contract is traded through an exchange that guarantees payment to the buyer of any amount owed to the buyer from the seller as a result of the contract and that guarantees payment to the seller of any amount owed to the seller from the buyer as a result of the contract. The price of the contract is determined based on preselected notional cash flows discounted by an interest rate swap curve obtained from a preselected swap rate source.

39 Claims, 18 Drawing Sheets

OTHER PUBLICATIONS

"About the product," LIFFE, <http://www.liffe.com/liffe/products/lfabout.htm>, Sep. 15, 1998.

"Summary of Generic Contract Specification Euro/DM–Denominated LFB Futures Contract," LIFFE, <http://www.liffe.com/liffe/products/lfbspec.htm>, Sep. 15, 1998.

"Your questions answered," LIFFE, <http://www.liffe.com/liffe/products/lfbqas.htm>, Sep. 15, 1998.

"LIFFE Launches LiborFinancedBond Futures Contract on Oct. 15," LIFFE, <http://www.liffe.com/liffe/news/newslfb.htm>, Sep. 15, 1998.

Louis, J.C., "A New Alternative to Vanilla Swaps," Derivatives Strategy, Jul.–Aug. 1997, pp. 12–13.

Jenna Michaels, Wall Street & Technology, 3 pages only, "Customized Listed Contracts," May 1993.

Ivy Schmerken, Wall Street Computer Review, vol. 6, No. 6, 4 pages only, "Swap Traders Sift Through Interest Rate Applications," Mar. 1989.

Computers in Banking, vol. 5, No. 1, 1 Page only, "Package Lets Banks Deal in Many Currencies," Jan. 1988.

Business Wire, 2 pages only, "Dow Jones To Distribute Bank Prices of Interest Rate Swaps, Options & Energy Derivatives From Intercapital Group," Oct. 14, 1997.

Principles of Corporate Finance, pp. 707–729 and pp. G1–G13, "Hedging Financial Risk," Oct. 14, 1997.

* cited by examiner

| | A | B | C | D | E | F | G | H | I | J | K |
|---|---|---|---|---|---|---|---|---|---|---|---|
| 1 | | | | INPUTS | | | | | | OUTPUTS | |
| 2 | | | | (Alter Blue Figures in Green Background/DropDown Lists Only) | | | | | | | |
| 3 | | | | | | | | | | Front Month | |
| 4 | Swap Rates (taken on Last Trading Day) | | | | | | | | | Effective Date | 16-Dec-98 |
| 5 | Swaps (Fixed Side) Daycount | 360 | | | | | Notional Cash Flows | | | EDSP | 111.03 |
| 6 | Swap Settlement Delay (Days) | 2 | | | | | Notional Coupon | 6 | | Back Month | |
| 7 | Libor Daycount | 360 | | | | | Start Date | 16-Dec-98 | | Effective Date | 17-Mar-99 |
| 8 | Last Trading Day | 14-Dec-98 | | | | | Initial Maturity | 10 | | Fair Value (as of Front Month Effective Date) | 110.49 |
| 9 | | | | | | | End Date | 16-Dec-08 | | | |
| 10 | Type | Source | Term | | Rate | | | | | Calendar Roll | |
| 11 | | | | | | | | | | Calendar Roll (price basis points) | 54 |
| 12 | Zero Coupon | LIBOR | Months 1 | | 3.457 | | | | | | |
| 13 | Zero Coupon | LIBOR | 3 | | 3.469 | | | | | | |
| 14 | Zero Coupon | LIBOR | 6 | | 3.469 | | | | | | |
| 15 | Zero Coupon | LIBOR | 9 | | 3.531 | | | | | | |
| 16 | | | Years | | | | Delivery Month Details | | | | |
| 17 | Fixed Income | IRS mkt | 1 | | 3.570 | | Expiring Front Month | Effective Date | Remaining Maturity | | |
| 18 | Fixed Income | IRS mkt | 2 | | 3.628 | | Dec-98 ▽ | 16-Dec-98 | 10 | | |
| 19 | Fixed Income | IRS mkt | 3 | | 3.731 | | Back Month | Effective Date | | | |
| 20 | Fixed Income | IRS mkt | 4 | | 3.860 | | Mar-99 | 17-Mar-99 | 9 3/4 | | |
| 21 | Fixed Income | IRS mkt | 5 | | 4.000 | | | | | | |
| 22 | Fixed Income | IRS mkt | 6 | | 4.139 | | | | | | |
| 23 | Fixed Income | IRS mkt | 7 | | 4.276 | | | | | | |
| 24 | Fixed Income | IRS mkt | 8 | | 4.409 | | | | | | |
| 25 | Fixed Income | IRS mkt | 9 | | 4.522 | | | | | | |
| 26 | Fixed Income | IRS mkt | 10 | | 4.621 | | | | | | |

FIG. 8

| | A | B | C | D | E | F | G | H | I | J |
|---|---|---|---|---|---|---|---|---|---|---|
| 1 | Source | Term | Maturity of par swap | Day | Rate | "Following" Maturity | Day of "Following" Maturity | Accrual Factor | | Zero Coupon Discount Factor (term from Front Month Effective Date) |
| 2 | | Year(s) | 16-Dec-98 | Wednesday | | | Wednesday | | | 1.000000 |
| 3 | BBA LIBOR | 1/12 | 16-Jan-99 | Saturday | 3.457 | 18-Jan-99 | Monday | 0.091666667 | | 0.996841 |
| 4 | BBA LIBOR | 1/4 | 16-Mar-99 | Tuesday | 3.469 | 16-Mar-99 | Tuesday | 0.25 | | 0.991403 |
| 5 | BBA LIBOR | 1/2 | 16-Jun-99 | Wednesday | 3.469 | 16-Jun-99 | Wednesday | 0.505555556 | | 0.982766 |
| 6 | BBA LIBOR | 3/4 | 16-Sep-99 | Thursday | 3.531 | 16-Sep-99 | Thursday | 0.761111111 | | 0.973827 |
| 7 | IRS mkt | 1 | 16-Dec-99 | Thursday | 3.570 | 16-Dec-99 | Thursday | 1.000 | 0.965531 | 0.965531 |
| 8 | IRS mkt | 2 | 16-Dec-00 | Saturday | 3.628 | 18-Dec-00 | Monday | 1.006 | 0.936178 | 0.9310060 |
| 9 | IRS mkt | 3 | 16-Dec-01 | Sunday | 3.731 | 17-Dec-01 | Monday | 0.997 | 0.893233 | 0.8957207 |
| 10 | IRS mkt | 4 | 16-Dec-02 | Monday | 3.860 | 16-Dec-02 | Monday | 0.997 | 0.856662 | 0.8590481 |
| 11 | IRS mkt | 5 | 16-Dec-03 | Tuesday | 4.000 | 16-Dec-03 | Tuesday | 1.000 | 0.821092 | 0.8210922 |
| 12 | IRS mkt | 6 | 16-Dec-04 | Thursday | 4.139 | 16-Dec-04 | Thursday | 1.000 | 0.782488 | 0.7824880 |
| 13 | IRS mkt | 7 | 16-Dec-05 | Friday | 4.276 | 16-Dec-05 | Friday | 1.000 | 0.743496 | 0.7434964 |
| 14 | IRS mkt | 8 | 16-Dec-06 | Saturday | 4.409 | 18-Dec-06 | Monday | 1.006 | 0.708206 | 0.7042934 |
| 15 | IRS mkt | 9 | 16-Dec-07 | Sunday | 4.522 | 17-Dec-07 | Monday | 0.997 | 0.664801 | 0.6666523 |
| 16 | IRS mkt | 10 | 16-Dec-08 | Tuesday | 4.621 | 16-Dec-08 | Tuesday | 0.997 | 0.628558 | 0.6303087 |

*FIG. 9*

| | A | B | C | D | E | F |
|---|---|---|---|---|---|---|
| 1 | | | | | | |
| 2 | Cash flow (in years from Start day) | Notional Cash Flow (CF) Dates | "Following" Cash Flow Dates | Accrual Factor (30E/360) | Notional Cash Flow | Adjusted Cash Flow |
| 3 | Start Date | 16-Dec-98 | 16-Dec-98 | | | |
| 4 | 1 | 16-Dec-99 | 16-Dec-99 | 1.000 | 6 | 6 |
| 5 | 2 | 16-Dec-00 | 18-Dec-00 | 1.006 | 6 | 6.033333333 |
| 6 | 3 | 16-Dec-01 | 17-Dec-01 | 0.997 | 6 | 5.983333333 |
| 7 | 4 | 16-Dec-02 | 16-Dec-02 | 0.997 | 6 | 5.983333333 |
| 8 | 5 | 16-Dec-03 | 16-Dec-03 | 1.000 | 6 | 6 |
| 9 | 6 | 16-Dec-04 | 16-Dec-04 | 1.000 | 6 | 6 |
| 10 | 7 | 16-Dec-05 | 16-Dec-05 | 1.000 | 6 | 6 |
| 11 | 8 | 16-Dec-06 | 18-Dec-06 | 1.006 | 6 | 6.033333333 |
| 12 | 9 | 16-Dec-07 | 17-Dec-07 | 0.997 | 6 | 5.983333333 |
| 13 | 10 | 16-Dec-08 | 16-Dec-08 | 0.997 | 106 | 105.9833333 |

*FIG. 10A*

| G | H | I | J | K | L |
|---|---|---|---|---|---|
| Discount Factor (From Front Effective Date) | PV (Front Effective Date) of Adj Cash Flows | PV (Front Effective Date) of Cash Flows After front Month | PV (Back Effective Date) of Cash Flows After Back Month | AI at Front Month Effective Date | AI at Back Month Effective Date |
| 0.966 | 5.793 | 5.793183354 | 5.843974503 | 0 | 1.516666667 |
| 0.931 | 5.617 | 5.617069558 | 5.666316647 | 0 | 0 |
| 0.896 | 5.359 | 5.359395573 | 5.40638369 | 0 | 0 |
| 0.859 | 5.140 | 5.139971205 | 5.185035383 | 0 | 0 |
| 0.821 | 4.927 | 4.926553083 | 4.969746138 | 0 | 0 |
| 0.782 | 4.695 | 4.694927743 | 4.736090047 | 0 | 0 |
| 0.743 | 4.461 | 4.460978687 | 4.500089866 | 0 | 0 |
| 0.704 | 4.249 | 4.249236816 | 4.28649157 | 0 | 0 |
| 0.667 | 3.989 | 3.988803133 | 4.023774456 | 0 | 0 |
| 0.630 | 66.802 | 66.80221772 | 67.3878994 | | |

| FIG.11A | FIG.11B |
|---------|---------|
| FIG.11C | FIG.11D |

*FIG. 11*

| | |
|---|---|
| Today | 12/11/98 |
| Swap/Libor Delay (days) | 2 |
| Swap/Libor Settle | 12/15/98 |
| Delivery Day | 12/16/98 |
| Last Trading Day | 12/14/98 |
| Notional Coupon | 6 |
| LPB Maturity | 10 |
| Interpolation | 2 |

Implied Futures Price (IPF) Calculator-alter blue figures/drop-down box only

| | | | | | Outputs | | | |
|---|---|---|---|---|---|---|---|---|
| | | | Dirty Price (present value) as of trade date | Implied Futures Price (IFP) | Implied Financing rate | Implied YTM/par swap rate at Expiry | Implied spot YTM | Delta Vector (Change in IFP) |
| | | | 101.54 | 101.56 | 3.46% | 4.801% | 4.801% | 8.0161 |

Rates to Discount Factors

| Source | Nominal term (years) | DM Swap/Libor Rate | "Following" Maturity of depo/par swap | Accrual Factor | Zero Coupon discount factors | Par swap sensitivity | Number of notional cashflow | "Following" notional cashflow date |
|---|---|---|---|---|---|---|---|---|
| | | | | | | | 0 | 12/16/98 |
| Libor | 0.08333 | 3.470 | 12/15/98 | 0.086111 | 1.000000 | | | |
| Libor | 0.25 | 3.520 | 1/15/99 | 0.250000 | 0.997021 | | 1 | 12/16/99 |
| Libor | 0.5 | 3.590 | 3/15/99 | 0.505556 | 0.991277 | | 2 | 12/18/00 |
| Libor | 0.75 | 3.590 | 6/15/99 | 0.761111 | 0.982174 | | 3 | 12/17/01 |
| IRS market | 1 | 3.635 | 9/15/99 | 1.000000 | 0.973403 | | 4 | 12/16/02 |
| | | | 12/15/99 | | 0.964925 | 0.9649 | 5 | 12/16/03 |

FIG. 11A

METHOD, SYSTEM, AND COMPUTER PROGRAM PRODUCT FOR TRADING INTEREST RATE SWAPS

CROSS-REFERENCE TO RELATED APPLICATIONS

This application claims priority from U.S. Provisional Application Ser. No. 60/074,588, filed Feb. 13, 1998, U.S. Provisional Application Ser. No. 60/101,419, filed Sep. 22, 1998, and U.S. Provisional Application Ser. No. 60/104,400, filed Oct. 15, 1998, each of which is incorporated herein by reference.

BACKGROUND OF THE INVENTION

1. Field of the Invention

This invention relates to a method, a system, and a computer program product for trading and settling a product. More particularly, the present invention relates to a method, a system, and a computer program product for trading and settling a contract having a price based on any preselected interest rate swap curve.

2. Discussion of the Background

An interest rate swap (IRS) is a well known financial transaction which usually occurs between two parties. In a swap, the two parties agree to make payments to each other; the payments of the first and second parties define the type of swap. In a basis swap, the payments made by the first and second parties are based on different floating (i.e., changing) interest rates in the same currency. In a currency swap, the payments are made based on either fixed and/or floating interest rates in different currencies. In an IRS, the payments made by the parties are in the same currencies, but one of the party's payments are based on a fixed interest rate while the other party's payments are based on a floating interest rate. The two parties to the IRS are called counterparties.

The purpose of an IRS is often to insulate or protect (like buying an insurance policy) one of the parties from changing interest rates. However, such an insulation or protection from changing interest rates results in an added cost to the party seeking protection from the potential change. This type of financial transaction, where the risk of loss is reduced, is referred to as hedging. In the IRS, while one party is hedging its losses, the other party is seeking financial gain based on speculation that the added cost paid by the party seeking to hedge its losses due to interest rate fluctuation will be greater than the actual change in value due to the interest rate change.

Advancing to further details of the mechanics of an IRS, the payments made between the parties are based on interest rates. However, the interest rate is only one factor in determining the amount of payment; the other factor is the amount of principal which is periodically multiplied by the different interest rates to determine the payments made by the parties to each other. However, in an interest rate swap, there is no exchange or payment of principal, so the principal is referred to as being a notional amount. This notional amount dictates the size of the interest payments and is agreed on by the parties when negotiating the terms of the IRS. The notional amount remains constant for the duration of the swap. For those unfamiliar with financial terminology, a glossary of general financial terms is provided in the appended "Glossary of Terms."

FIG. 1 illustrates an exemplary IRS between a first dealer 2 (e.g., a typical bank which is relatively small in size) which desires to reduce the risk of interest rate fluctuation and a second dealer 8 (e.g., a large financial institution) which is willing to accept a risk in interest rate fluctuation in return for receiving a higher fixed interest rate. The first dealer 2 agrees to pay the second dealer 8 interest payments that are based on a long term fixed rate. In exchange, the second dealer 8 agrees to pay the first dealer 2 interest payments that are based on a short term floating rate. Thus, the first dealer 2 and the second dealer 8 are counterparties. Typically, the floating interest rate is tied to the London Interbank Offered Rate (LIBOR). If the first dealer 2 and the second dealer 8 enter into a swap over a period of five years, the first dealer 2 pays out interest to the second dealer 8 according to the fixed long term rate and receives interest from the second dealer 8 according to the three month LIBOR rate for a five year period. Conversely, the second dealer 8 receives interest payments from the first dealer 2 according to the fixed long term rate and pays interest payments to the first dealer 2 based on the floating short term rate (i.e., the three month LIBOR rate). As mentioned above, both the fixed long term rate and the LIBOR rate are applied to a common notional principal. Alternatively, both series of cash flows could be based on different floating interest rates, i.e., variable interest rates that are based upon different underlying indices. This type of IRS is known as a basis or a money market swap.

Before entering an IRS contract, the first dealer 2 and the second dealer 8 may try to value the price of the IRS before making a decision whether to enter into the IRS contract. The value of an IRS is the difference between the net present value (NPV) of the two future income streams that are swapped by the first dealer 2 and the second dealer 8. Because the floating interest rate varies in the future, the size of each future cash flow based on the floating interest rate is not known to either the first dealer 2 or the second dealer 8. To solve this problem the swap market uses forward implied interest rates to estimate the NPV of the fixed and floating interest rates. The forward interest rates may be derived from the International Swap Dealers Association (ISDA) Benchmark Swap Rates fixing for example.

An IRS is effectively a construction of two cash flow streams with the same maturity. One of the cash flow streams is comparable to that of a bond (fixed interest rate payments) and the other cash flow stream is comparable to a periodically revolving borrowing/lending facility or Floating Rate Note (floating interest rate payments). Mathematical analysis shows that the NPV of an IRS has an interest rate sensitivity similar to the price of a bond having a similar coupon, maturity, and credit rating.

The similarity in the interest rate sensitivity of IRSs and bonds explains the heavy use of government bond futures, government bond repos, and the cash market to manage interest rate risk resulting out of IRS transactions. However, this practice also involves two major disadvantages. First, both market segments are based on different credits and therefore an unexpected change in the yield differential of the two markets could result in heavy losses. Second, conventional techniques require efficient access to the bond and repo market. Specifically, repo transactions can be problematic since these transactions have to be renegotiated on a regular basis and market conditions can be very volatile.

For a more comprehensive treatment of the subject of swaps, see Kolb, Robert W., "Futures, Options, and Swaps," $2^{nd}$ ed., May 1997, incorporated herein by reference. For an overview of general financial theory, see Brealy and Myers, "Principles of Corporate Finance," McGraw-Hill Companies, Inc., 1996, incorporated herein by reference.

The IRS market is, by some measures, the largest sector of the global fixed income market. The size of the IRS market has grown from zero dollars in 1980 to approximately $30 trillion outstanding as of mid-1998.

Despite the enormous size of the IRS market, barriers to entry exist for new, and sometimes existing, participants. This is due to the fact that the IRS market is a marketplace which is based on bilateral agreements rather than on tradeable and securitized assets. However, the International Swaps and Derivatives Association (ISDA) provides a legal master documentation for IRS transactions (http://www.isda.org/cl.html), which is heavily used. ISDA agreements are essential for each new counterparty, and amendments to agreements are required for each new deal with a particular counterparty. Thus, each transaction is a separately negotiated contract with little standardization of financial terms. The contracts are lengthy and complex, and legal review is required for each transaction. Hence any large and sophisticated users must endure the overhead burdens associated with the conventional, inefficient operating environment of the IRS market.

Within the IRS market, bilateral netting agreements facilitate netting of positions between specific counterparties by reducing credit exposure and freeing up capital; however, it is difficult, if not impossible, for participants to freely net deals across multiple counterparties. Further, it is time consuming and cumbersome to settle each agreement separately, and there is no guarantee that the cancellation or assignment of a particular contract provides the best price.

The users of the IRS market are, in essence, all organizations who are exposed to interest rate risk. This includes banks, state treasuries, supranational organizations, insurance companies, investment funds, large corporations, and increasingly small and medium sized corporations. The major participants and liquidity providers in the IRS market are global banks which are able to manage interest rate risk and efficiently administer the vast number of IRS transactions.

The various barriers to entry into the IRS market have resulted in a heavy concentration of business among a handful of the largest global banks. This oligopolistic environment has led to an artificial lack of market transparency (since each transaction is unique and propriety to the counterparties) and the discrimination of many market participants who would benefit from more direct access to the IRS market. Large and sophisticated users of IRSs (for example, large corporations) must often operate at a pricing disadvantage to the large global banks with whom they must conduct their business.

In the past, at least one attempt was made to eradicate some of the problems that exist in the IRS market. In the 1980's, the Chicago Board of Trade (CBOT) introduced a product that sought to replicate the interest rate sensitivity of an IRS by applying the product design of short-term interest rate instruments, i.e., 100 minus the IRS rate of a predefined maturity. However, the CBOT product exhibited considerable design problems and received little customer support.

SUMMARY OF THE INVENTION

The invention is based on the concept of the creation of an array of notional cash flows which are discounted to a predefined date and based on the IRS curve of a particular currency.

Accordingly, it is an object of the present invention to provide a novel method, system, and computer program product for trading contracts that are valued based on an IRS curve.

It is an additional object of the present invention to provide a novel method, system, and computer program product for settling contracts that are valued based on an IRS curve.

It is another object of the present invention to provide a novel method, system, and computer program product for an improved trading and hedging instrument in the IRS market.

It is a further object of the present invention to provide a novel method, system, and computer program product that reduces the overhead costs associated with conventional interest rate hedging.

It is a yet another object of the present invention to provide a novel method, system, and computer program product for transparently pricing a contract having a price sensitivity similar to an IRS.

Additionally, it is another object of the present invention to provide a novel method, system, and computer program product which allows equal chances for a greater number of market participants to get exposure to IRS market risk.

Furthermore it is another object of the present invention to provide a novel method, system, and computer program product which reduces the cost of capital associated with being exposed to IRS risk.

These and other objects are provided by a method, system, computer program product, and data structure for transparently pricing interest rates swap contracts. According to the invention, a standardized contract is traded. The contract obligates a buyer and a seller to settle the contract based on a price of the contract at a first effective date. The contract is traded through an exchange or alternative trading mechanism (e.g., a clearing agent) and cleared by a clearinghouse that guarantees payment to the buyer of any amount owed to the buyer from the seller as a result of the contract and that guarantees payment to the seller of any amount owed to the seller from the buyer as a result of the contract.

Since the same notional cash flows, swap rate curve, effective date(s), and pricing model are used for each contract type, each contract type is a standardized instrument. In other words, the contracts of the same type are priced transparently with respect to one another. Thus, a standardized contract having a price sensitivity similar to an interest rate swap, can be traded freely on an exchange like any other standardized asset (e.g., bond futures).

There are two main variations of the inventive contract—the cash settled contract and the autoroll contract. With the cash settled contract, the effective date marks the expiration of the contract. Thus, if a trader has purchased a cash settled contract as a hedge against changes in interest rates, then the trader has to purchase a new cash settled contract on the effective date of the first cash settled contract in order to maintain that hedge. On the other hand, an autoroll contract does not expire on the effective date; instead, the price of the autoroll contract is recalculated based on the next effective date. Thus, the autoroll contract is said to roll over to the next effective date. A single autoroll contract may be rolled over many times, and thus, the autoroll contract has the character of a series of cash settled contracts. Therefore, the time to maturity of the bond underlying the autoroll contract becomes smaller each time the autoroll contract rolls over.

In one embodiment of the present invention, the autoroll contract is not limited to an IRS contract, but may be any type of futures contract that automatically rolls over on the effective date. In other words, an autoroll feature may be applied to any type of futures contract. The autoroll contract advantageously permits a trader to maintain a position in a futures contract through multiple effective dates without having to resell or repurchase new futures contracts at each effective date.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 8, 9, 10A, and 10B are images of spreadsheet screens that illustrate how the present invention can be implemented with a standard spreadsheet program.

DESCRIPTION OF THE PREFERRED EMBODIMENTS

Figure 2:
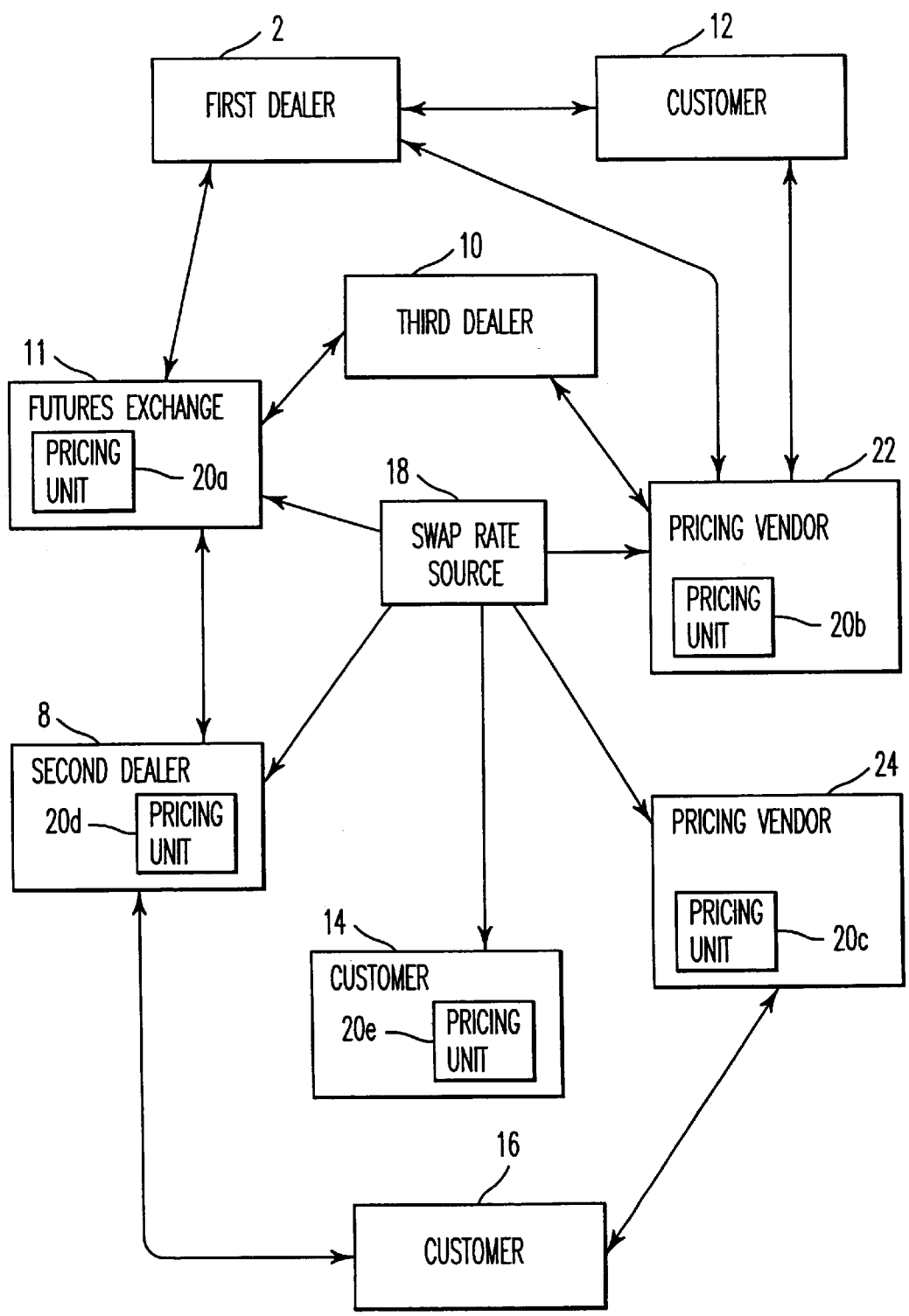
FIG. 2 is a block diagram illustrative of an exchange-based trading system for trading a contract priced according to the present invention.

Referring now to the drawings, and more particularly to FIG. 2 thereof, a block diagram illustrative of an exchange-based trading system for trading contracts having a price sensitivity similar to an IRS is shown. There are two main varieties of the inventive contract—the cash settled variety and the autoroll variety—which are described in greater detail below with reference to FIGS. 5(a) and 5(b).

Referring back to FIG. 2, a first dealer 2, a second dealer 8, and a third dealer 10 communicate with a futures exchange 11. A customer 12 communicates with the first dealer 2, and customers 14 and 16 communicate with the second dealer 8. The futures exchange 11, pricing vendors 22 and 24, the second dealer 8, and customer 14 each have a pricing units 20a, 20b, 20c, 20d, 20e, respectively, that communicate with a swap rate source 18. The first dealer 2, the first customer 12, and the third dealer 10 communicate with the pricing unit 20b of the pricing vendor 22. Similarly, the customer 16 communicates with the pricing unit 20c of the pricing vendor 24. The communications between the various entities in the system include, but are not limited to, trade entries, comparisons, the exchange of money, or any other type of information, data, or evidence.

The futures exchange 11 provides a forum through which the dealers 2, 8, 10 can trade. The futures exchange 11 incorporates any variety of rules, conventions, and facilities for trading between the dealers 2, 8, 10. For example, the futures exchange 11 can have a trading floor where trades are physically made, or the futures exchange 11 can provide a connection to a computer network over which trades are executed electronically. The futures exchange 11 may include an internal or independent clearinghouse (not shown) that becomes the counterparty to all or a portion of the contracts traded on the exchange, and thus, guarantees the financial integrity of the dealers 2, 8, 10. The futures exchange 11 may also provide for anonymous trading between the dealers 2, 8, 10.

Preferably, the futures exchange 11 incorporates a screen-based (i.e., computerized) trading system. For example, the London Interbank Financial Futures and Options Exchange's (LIFFE's) electronic trading platform, APT (Automated Pit Trading System), may be used. Other trading platforms, such as LIFFE CONNECT, are also suitable, as the present invention is easily adapted to virtually any conceivable trading system. LIFFE CONNECT incorporates an open architecture and is accessible over the Internet. The invention is also applicable to any trading or futures market in the United States or elsewhere in the world, for example, the Chicago Board of Trade, the Chicago Mercantile Exchange, the Bolsa de Mercadorias e Futoros (in Brazil), the London International Financial Futures Exchange, the New York Mercantile Exchange, MATIF (in Paris, France), the London Metal Exchange, the Tokyo International Financial Futures Exchange, the Tokyo Commodity Exchange for Industry, and the Meff Renta Variable (in Spain).

The dealers 2, 8, 10 each have respective accounts with the futures exchange and execute trades through the futures exchange 11 on their own behalf and on behalf of the customers 12, 14, 16. Preferably, margining takes place periodically between the futures exchange 11 and the dealers 2, 8, 10. Most preferably, margining may occurs on a mark-to-market basis since that is the prevailing convention in futures markets, although the invention may be implemented without margining, if desired.

The customers 12, 14, 16 may be any individual, group, or institution that wishes to trade a contract having a price sensitivity resembling an IRS; for example, swap traders, bond hedgers, arbitrageurs, speculators, yield curve traders, and relative value traders are potential customers. The customers 12, 14, 16 receive price quotes of various traded contracts from the dealers with which they have established trading accounts. The customers 12, 14, 16 may also receive model prices from the pricing units 20a, 20b, 20c, 20d, 20e, which may be programmed computers, for example, the general purpose computer 100 shown in FIG. 7. As shown, customer 14 has its own model pricing unit 20e, whereas customer 12 obtains model prices generated by the pricing unit 20b of pricing vendor 22, and customer 16 obtains model prices generated by the pricing unit 20c of pricing vendor 24. In deciding whether to place a trade with a particular dealer 2, 8, or 10, the customers 12, 14, 16 can compare the prices quoted by the dealers 2, 8 and 10 against the model price generated by the model pricing units 20a, 20b, 20c, 20d, 20e. For example, the customer 16 could compare price quotes received from the second dealer 8 against the price quotes received from the pricing unit 20c of the pricing vendor 24. The dealers may also provide the model price to the customers. Although the quoted price will be dictated by the forces of supply and demand (as with any other traded product), in most instances, the quoted price will be tied to the model price since the model price becomes the settlement price when the traded contract matures or rolls. "Maturity" and "roll" are described in greater detail below with reference to FIGS. 5(a) and 5(b).

A swap rate source 18 provides the IRS curve. The swap rate source 18 can be any source of interest rates suitable for determining the net present value (NPV) of an IRS, such as forward interest rates. Preferably, the swap rate source is LIBOR for interest rates less than a year and is the ISDA Benchmark Swaps rate fixings for interest rates one year or more into the future. The swap rate curve is a plot of the interest rates obtained from the swap rate source 18; for example, the swap rate curve could be defined by LIBOR at 3, 6, and 9 months and by the ISDA Benchmark Swaps Rate fixing at 1 year, 2 years, 3 years, etc., until the maturity of the contract. In an alternate embodiment, the swap rate source is EURIBOR, TIBOR, or any other suitable swap rate source.

The pricing units 20a, 20b, 20c, 20d, 20e provide the model price for the contracts. For any set of interest rates and notional cash flows, the pricing units 20a, 20b, 20c, 20d, 20e can determine the model price of any contract priced in accordance with the present invention. The model pricing units 20a, 20b, 20c, 20d, 20e may include a programmed microprocessor, dedicated circuitry, or any combination thereof, configured to determine the model price. Also, some customers and dealers may wish to alter the pricing model used by the model pricing units 20a, 20b, 20c, 20d, 20e if, for example, the alterations are believed to result in a better predictor of future prices than the pricing model. It should be noted, however, that the actual settlement prices are determined with the pricing model in the model pricing units 20a, 20b, 20c, 20d, 20e, i.e., the model price becomes the settlement price.

The model price is the NPV of a stream of future cash flows discounted by the swap interest rates applicable in each future time period when a cash flow is received (for example, at the end of 1 year, at the end of 2 years, at the end of 3 years, etc.). To determine the model price, the pricing units 20a, 20b, 20c, 20d, 20e model the two series of cash flows, builds a par yield curve based on traded rates, converts the par yield curve into a zero coupon curve, interpolates between the zero rates, determines the discount factors using bootstrapping, and multiplies the notional cash flows with the discount factors, as discussed below with reference to FIG. 4(a).

If a dealer or customer does not have their own pricing unit, model prices may be obtained from pricing vendors 22 and 24. As shown in FIG. 2, a second dealer 8 and customer 14 each have their own pricing unit 20d and 20e, respectively, to calculate model price. On the other hand, the first dealer 2, the third dealer 10, customer 12, and customer 16 do not have their own pricing units, and therefore, must obtain model prices that are generated externally. The first dealer 2 and the customer 12 receive model prices from pricing vendor 22, and the customer 16 receives model prices from the pricing vendor 24.

The various communications links between the futures exchange 11, the first dealer 2, the customer 12, the third dealer 10, the pricing vendor 22, the swap rate source 18, the second dealer 8, the customer 14, the pricing vendor 24, and the customer 16 can be established over a network of computers linked by telephone lines, for example. Alternatively, some or all of the interconnections can be established by voice over a telephone network. For example, customers 12 and 16 may each have their own general purpose computer 100 (FIG. 7) that communicates with a general purpose computer 100 of the pricing vendor 22 or the pricing vendor 24 via public telephone lines. Likewise, communications between the swap rate source 18 and the various pricing units 20a, 20b, 20c, 20d, 20e can be established over a private computer network and/or over a publicly accessible computer network. Potential computer networks over which the present invention can be implemented include local area networks and wide area networks, including the Internet, for example. Computer network systems such as those provided by Bloomberg Financial and Reuter's are easily adapted to provide pricing vendors and/or to disseminate the interest rates provided by the swap rate source. Also, anyone with a model pricing unit could obtain the interest rate curves indirectly (for example, from a publication), and manually input the information into a model pricing unit.

Figure 3:
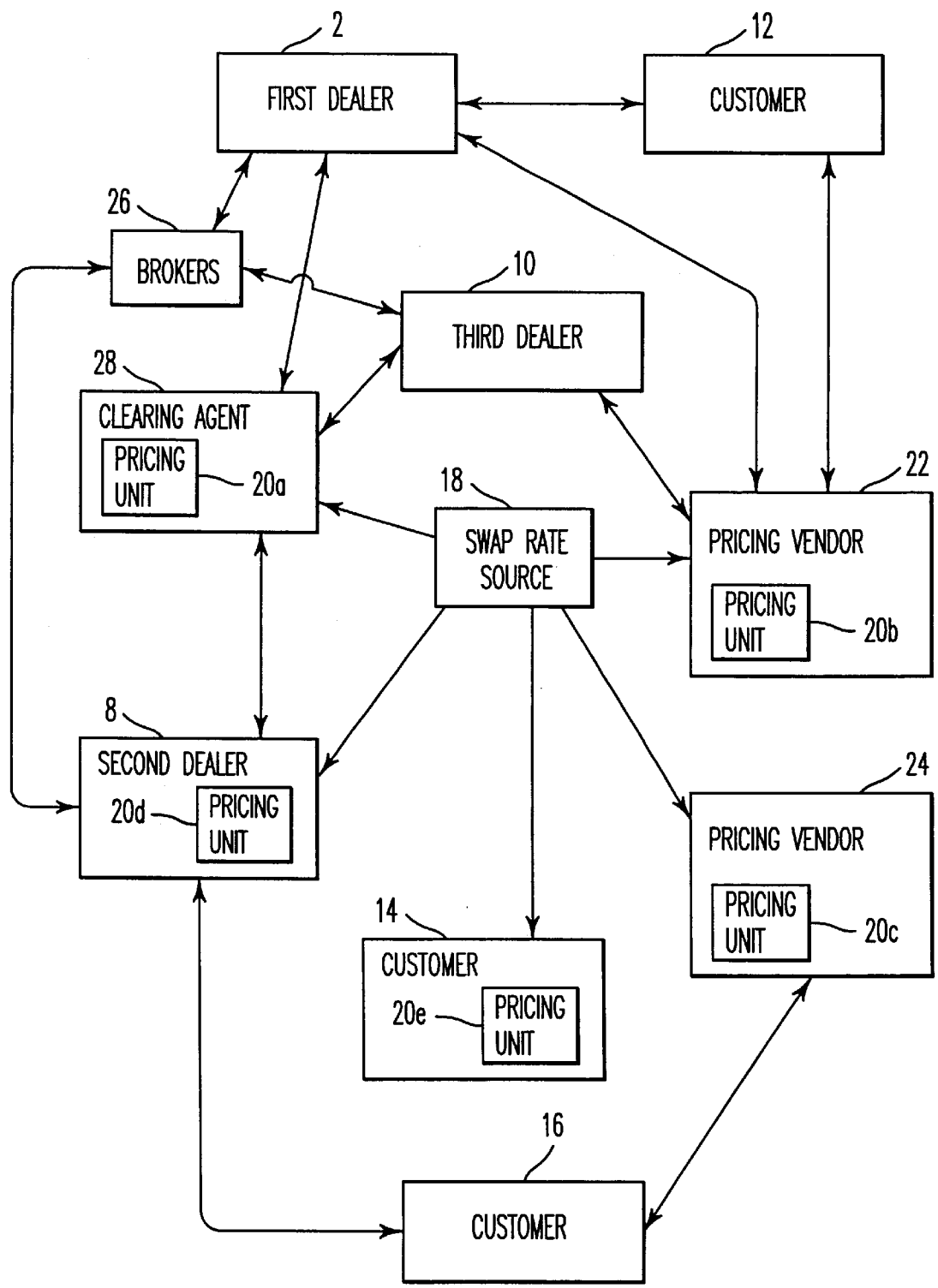
FIG. 3 is a block diagram illustrative of an over-the-counter (OTC) trading system for trading contracts priced according to the present invention.

FIG. 3 is a block diagram describing an over-the-counter (OTC) trading system for contracts having a price sensitivity similar to an IRS. The OTC trading system of FIG. 3 is similar to the exchange-based trading system of FIG. 2, except that the OTC trading system of FIG. 3 incorporates brokers 26 and a clearing agent 28 instead of a single futures exchange 11. The clearing agent 28 handles all of the trading, netting, and margining between the dealers 2, 8 and 10. The clearing agent 28 preferably becomes the counterparty to all of the contracts traded therein, and thus, guarantees performance on each contract. The clearing agent 28 may also provide for anonymous trading between the dealers 2, 8, 10. The brokers 26 make confirmations to the dealers 2, 8, 10 that the trades of the dealers 2, 8, 10 have been executed.

The brokers 26 are preferably inter-dealer brokers who display live quotes from the dealers 2, 8, 10. After confirmation with a particular broker, each transaction is cleared through the clearing agent 28. Once the transaction is cleared through the clearing agent 28, the clearing agent 28 becomes the counterparty and guarantor to each contract. The clearing agent 28 may require that each customer 2, 8, 10 be approved by the clearing agent 28 to become a counterparty to the clearing agent 28.

The present invention is readily implemented on a system of networked computers such as a local area network or a wide area network (e.g., the Internet). Accordingly, buyers and sellers can send and receive trade data and other information (including prices, bids, quotes, basis information, and information relating to specific contracts, for example) at remote locations. The system of networked computers may also be configured to permit the dealers 2, 8, 10 to trade over the network. For example, trades could be executed over the Internet. The system of networked computers may form all or a portion of the exchange through which trading occurs (e.g., the futures exchange 11 or the clearing agent 28).

Figure 4A:
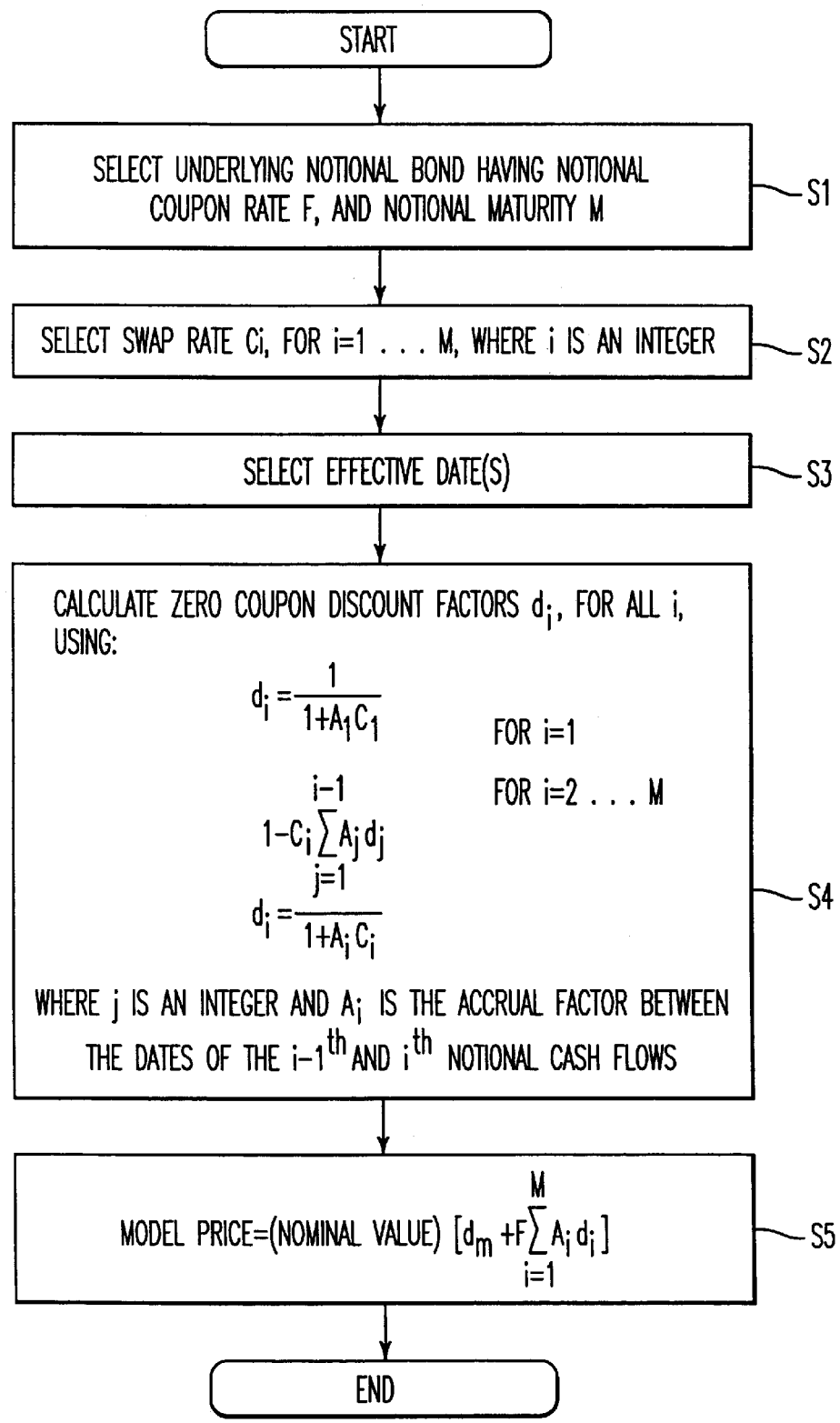
FIG. 4(a) is a flowchart describing the pricing model for a transparently priced contract having a price sensitivity based on an interest rate swap.

FIG. 4(a) is a flowchart that shows how the prices of the contracts are calculated in the pricing units 20a, 20b, 20c, 20d, 20e using a pricing model. The pricing model of FIG. 4(a) calculates the NPV of predefined cash flows. Thus, futures contracts that are priced according to the pricing model represent agreements to purchase or sell an IRS at a future date called the effective date or settlement date.

In step S1, a notional bond is selected having a notional coupon rate F, and a notional maturity M. Thus, the notional bond is a series of notional cash flows. The notional bond can be based on a fictitious series of cash flows or it can be based on the cash flows resulting from actual sources, for example, ten year German bonds (Bunds), five year Treasury Notes, etc. Choosing different denominations of currency cash flows permits the contracts to be expressed in different denominations. The cash flows may be implemented in any currency, e.g., Euros, German marks, Japanese yen, United Kingdom pounds, Singaporean dollars, Swiss francs, Italian lira, Hong Kong dollars, Australian Dollars, and U.S. dollars. If the notional coupon is 4.5%, for example, then the notional coupon rate F, is 0.045 (representing a bond that paid 4.5% of the notional amount every $i^{th}$ time period until the $M^{th}$ (time period).

Figure 4B:
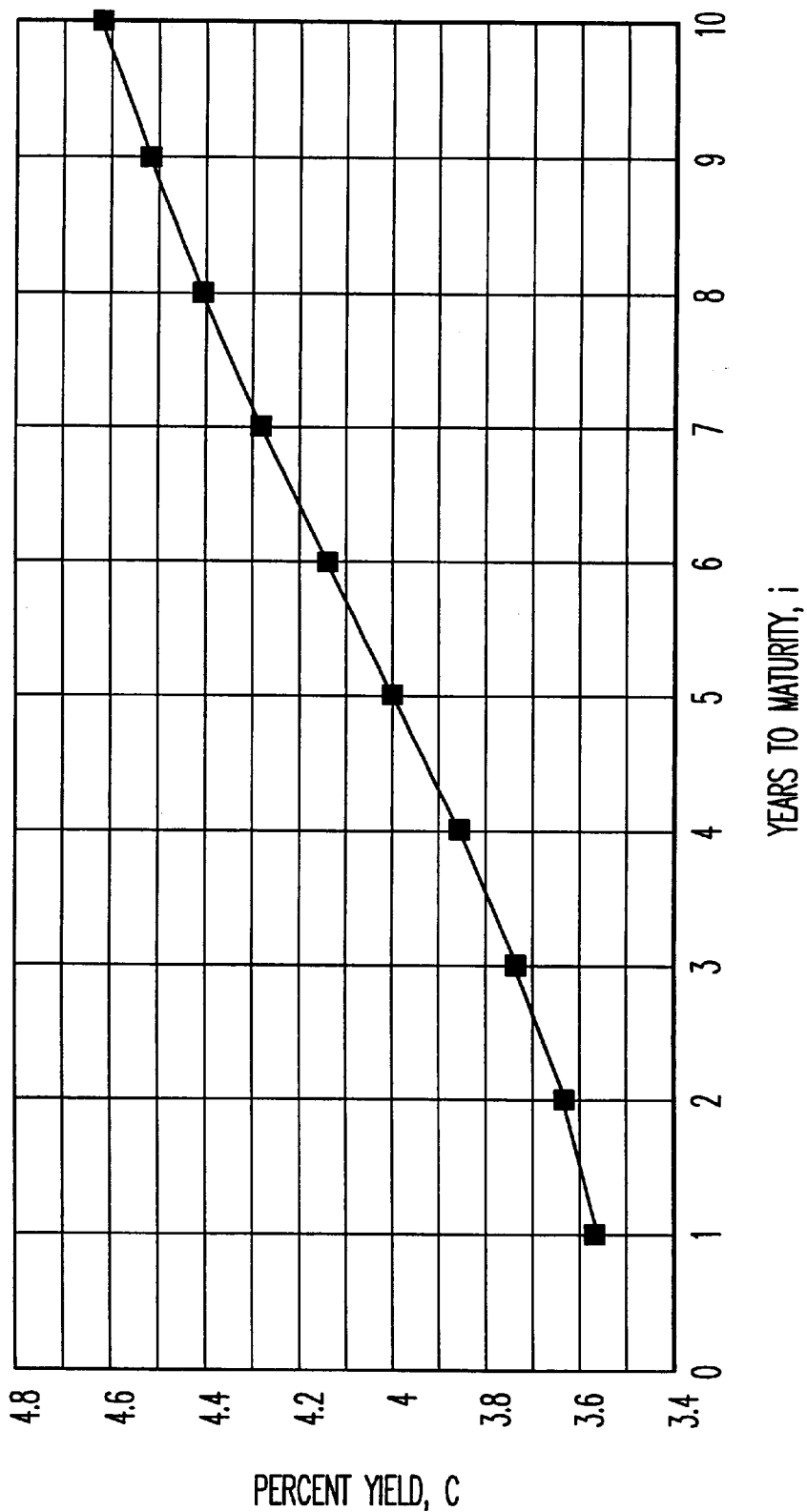
FIG. 4(b) is a graph of a typical interest rate swap curve.

In step S2, the swap rate C, is selected for every time period i. A graph of swap interest rates C, versus time periods until maturity i, forms a swap rate curve $C_i$. The swap rate curve $C_i$ is a par yield curve. That is, the swap rate C, for a particular maturity i, is defined as the fixed coupon on an IRS that would allow the IRS to trade at par (at zero cost, in the case of an IRS). FIG. 4(b) shows an exemplary swap rate curve $C_i$ for i=1 to 10 years.

The swap rates selected to form the swap rate curve can be provided by any suitable source of forward interest rates. Preferably, the swap rate source 18 is a commonly accepted source such as the LIBOR for future interest rates less than one year away and the ISDA Benchmark Swaps Rate fixing for future interest rates more than one year away, although any other desired source may be used. Interpolation may be used to determine swap rates in time periods for which an express rate does not exist. If interpolation is used, linear interpolation, exponential interpolation, cubic spline interpolation, exponential spline interpolation, or any other desired type of interpolation may be used.

In step S3, an effective date is selected for cash settled contracts. For a cash settled contract, the effective date is the date at which the contract ends and the two parties must settle the outstanding amount. For autoroll contracts, a maturity date is also selected in step S3. Thus, a cash settled contract is similar to a futures contract in that the counterparties agree to enter an IRS at a future date, i.e., the effective date. On the effective date, however, the seller and the buyer do not actually enter into an IRS transaction; rather, the parties settle the difference between the price that they contracted for and the model price of the cash settled contract. The model price may be determined by the pricing model shown in FIG. 4(a), for example. Thus, if a seller and a buyer agree to enter into an IRS transaction for $100 on the effective date, when the effective date arrives, the buyer pays the seller $5 if the model price is $95. If the model price had been $105, the seller would have payed the buyer $5. This example assumes that the contracts are not marked-to-market. If the contracts had been marked-to-market, the buyer and seller would have settled any outstanding amounts daily, at the close of trading. Thus, the cash exchanged at the effective date would be the difference between the previous day's model price after the close of trading and the model price at the effective date.

For an autoroll contract, the effective date is the date on which the counterparties settle any outstanding amount, and the contract automatically rolls over to the next effective date. At the rollover, the counterparties enter into a new agreement to settle on the next effective date, based on the difference between the current model price and the model price at the next effective date. Thus, the counterparties do not bid or negotiate on the price of the new contract; the buyer is obligated to buy at the current model price (i.e., the spot price), and the seller is obligated to sell at the current model price. When the contract rolls over, the parties effectively enter into a new, cash settled contract at the current model price (based on the next effective date). For example, a buyer agrees to pay a seller $100 for an autoroll contract having a first effective date of December 15. On December 15, the model price is $98, so the buyer pays the seller $2 (assuming that the contract is not marked-to-market). If the next effective date is March 15 and the model price on December 15 for delivery on March 15 is $94, then the seller will owe the buyer money if the model price on March 15 greater than $94. On the other hand, the buyer will owe the seller money if the model price on March 15 is less than $94. Thus, the initial futures price of the autoroll contract will be based on the bidding between the dealers 2, 8, 10. Thereafter, on each effective date, the futures price of the autoroll contract will automatically be reset to the model price for the next effective date.

The effective dates for the cash settled contracts and the autoroll contracts preferably occur on the same dates four times a year. For example, all of the effective dates may occur on the International Money Market (IMM) effective dates every March, June, September, and December. The maturity date for the autoroll contracts may be equal to, or earlier than, the maturity date of the underlying notional bond.

In step S4, the zero coupon discount factors $d_i$, are determined for every time period i. The discount factor d, represents the zero coupon discount factor calculated from the swap rate applicable for the period between the effective date and the $i^{th}$ notional cash flow. Thus, each discount factor $d_i$ represents the value today of one dollar received at time period i, based on the swap rate applicable in time period i. If the ISDA Benchmark Swaps Rate fixing provides the swap rate curve, then the zero coupon discount factors may be constructed from the most recent ISDA Benchmark Swap Rates fixing, using a standard bootstrap method. Then, the discount factors are rounded, for example, to the eighth decimal place. For time period i=1, the following formula is used to determine $d_1$:

$$d_1 = \frac{1}{1 + A_1 C_1}, \quad (1)$$

where $A_1$ and $C_1$ are the accrual factor and the swap rate, respectively, for the first time period (i=1). The accrual factor, A, represents the accrual factor between notional cash flows. For example, A could be defined in days on 30/360 daycount basis since a 360 daycount is conventional in the many bond markets. Then, $A_i$ would be the number of days between the dates of the $i-1^{th}$ and $i^{th}$ notional cash flows.

For all time periods from i=2 to i=M, bootstrapping is applied, using the following formula to determine $d_i$:

$$d_i = \frac{1 - C_i \sum_{j=1}^{i-1} A_j d_j}{1 + A_i C_i}, \quad (2)$$

where j is a positive integer, and $A_i$ and $A_j$ are the accrual factors in time period i and j, respectively. This process is called bootstrapping because $d_{i-1}$ has to be determined in order to determine $d_i$.

In step S5, the price is determined using the following formula:

$$\text{Model Price} = (\text{nominal value})\left[d_m + F\sum_{i=1}^{M} A_i d_i\right]. \quad (3)$$

The nominal value is an arbitrary number which preferably results in the final price having an order of magnitude similar to the price quotations of other traded contracts. For example, if the nominal value is 100, then the starting price of each contract will be around 100 if the swap interest rates selected by the futures exchange 11 or clearing agent 28 are close to the nominal coupon rate.

The pricing model is used to determine the price of the autoroll and cash settled contracts when the contracts are settled, whether settlement occurs daily, on the settlement date, or otherwise. If the pricing model of FIG. 4(*a*) is used to determine the settlement price, then the contracts will have a price sensitivity similar to an interest rate swap.

Contracts that are priced using the same pricing model and set of inputs are transparently priced because the contracts are standardized. In other words, once a pricing model and set of inputs are established (e.g., the pricing model shown in FIG. 4(*a*), using the swap curve, notional cash flows, and notional maturity shown in FIG. 8), a fungible contract based on the established pricing model and inputs can be traded. Such a contract offers several advantages: first, the contract can be freely traded by the dealers without regard to the identity of the counterparties; second, there is no need to enter into a unique, separately negotiated contract for each trade; and third, the benefits of trading on an exchange can be realized (e.g., guaranteed performance on the contract, economies of scale and scope, etc.).

FIG. 5(*a*) is a flowchart that shows an example of how a cash settled may be processed and traded. The cash settled contract is similar to a futures contract in that the party purchasing the contract agrees to buy the cash flows embodied by the contract at a future time for a price determined at a present time (e.g., today). Likewise, the party selling the contract agrees to sell the IRS embodied by the contract at a future time for a price determined at a present time (e.g., today).

First, in step S51 the cash settled contract is traded, i.e., it is either sold or purchased by one of the dealers 2, 8, 10 on an exchange (e.g., the futures exchange 11 or the clearing agent 28). The trades can be executed using any known system of trading, but preferably, the trades are executed (and confirmed) over a computer network so that trades take place quickly and efficiently, and so that records of trading activity can be automatically updated.

A trade occurs when a particular dealer makes an offer to buy or sell a cash settled contract, and that offer is accepted by another dealer that trades on the exchange. Typically, the offer is made available to all other dealers. A dealer does not have to own a contract to sell it, since a sale only represents the dealer's obligation to pay or receive the difference between the sales price (i.e., the futures price) and the price at the effective date (i.e., the spot price). Thus, for each type of contract, the number of contracts outstanding at any given time is only limited by the number of accepted offers to buy and sell.

The purchase or sales price of the contract is determined by supply and demand; however, the purchaser or seller of the cash settled contract may use the model price generated by a pricing unit as an estimated or fair price that can be compared to the market price. Since the model price becomes the actual price at settlement (as explained below), the market price and the model price will converge under normal circumstances as the effective date nears.

In step S52, the exchange on which the cash settled contract is traded (e.g., the futures exchange 11 or the clearing agent 28) checks to see whether the effective date has arrived. If the effective date has not arrived, then in steps S53 and S54, the contracts are marked-to-market. In step S53 the exchange uses its pricing unit 20*a* to determine the model price of the cash settled contract at the close of trading in accordance with the pricing model of FIG. 4. Then, in step S54 daily settlement takes place. In daily settlement, the counterparties to the traded contract settle the outstanding amount, based on the difference between today's model price at close and yesterday's model price at close. For example, if dealer 2 buys DM 500,000 worth of a particular contract at 99.00, and the model price at close is 99.25, then dealer 2 will owe the exchange (500,000)(2.5/100)=DM 1,500, assuming a nominal value of 100 in step 5(*a*). With steps S53 and S54, the exchange can maintain the dealers' 2, 8, 10 margin requirements.

If the effective date has arrived in step S52, then in step S55 the exchange uses its pricing unit 20*a* to determine the model price, using the pricing model of FIG. 4(*a*). The model price at the effective date becomes the settlement price of the contract. Then in step S56, the counterparties to the contract settle (via the exchange) based on the difference between the previous day's price at close and the settlement price. If the contract was not marked-to-market and the exchange did not require margin, then the parties would pay the difference between the purchase (or sales price) and the settlement price.

Preferably, the exchange nets the gains and losses of the various dealers in steps S54 and S56 to reduce the total number of transactions and the associated transaction costs. At any given time during the duration of the cash settled contract, the pricing units 20*a*, 20*b*, 20*c*, 20*d*, 20*e* can be used to determine a model price in accordance with the pricing model of FIG. 4. However, at the close of trading each day and at the effective date, the model price becomes the actual price used for marking-to-market and settlement.

FIG. 5(*b*) is a flowchart that shows an example of how an autoroll contract is traded and processed. The trading and processing of an autoroll contract is very similar to the trading and processing of the cash settled contract described in FIG. 5(*a*), with the addition of a roll feature which causes the autoroll contract to roll automatically at a date when the contract would settle if it were a cash settled contract. Thus, the autoroll contract behaves like a series of consecutive cash settled contracts.

In step S61, an autoroll contract is traded, i.e., it is either sold or purchased by a dealer. Autoroll contracts can be traded in the same manner as cash settled contracts; thus, step S61 is analogous to step S51.

In step S62, the exchange determines whether the next effective date has arrived. The effective dates are preferably spaced evenly throughout the year and may coincide with the effective dates for other futures contracts. For example, the IMM effective dates may provide the effective dates.

If the effective date has not arrived in step S62, then in step S63 it is determined whether the contract embodied by the autoroll contract has matured. If the notional cash flows of the autoroll contract are based on an actual bond, then the maturity of the autoroll contract preferably coincides with the maturity of the actual bond.

If the contract has not matured in step S62, then in steps S64 and S65 the contracts are marked-to-market. In step S64, the model price of the contract is determined after the close of trading, using the pricing model of FIG. 4(*a*). Next, in step S65 daily margining takes place based on the closing price determined in step S64. Steps S64 and S65 correspond to steps S53 and S54, respectively, of FIG. 5(a).

Steps S62, S63, S64 and S65 are repeated daily until the next effective date arrives as determined in step S62. If the next effective date has arrived, then in step S66 the settlement price is determined, using the pricing model of FIG. 4(a), and the autoroll contract is settled. Note that step S66 is the same as steps S55 and S56 in FIG. 5(a).

After the settlement price has been determined and the contract settled in step S66, then the autoroll contract is automatically rolled in step S67. The rolling step S67 preferably takes place without a specific user action; therefore, the autoroll contract is considered to be automatically rolled in step S67. When the contract is rolled, the price of the contract is set to the model price based on the next effective date, and thus, the counterparties to the autoroll contract have effectively entered into a new agreement to be settled on the next effective date. For example, a purchaser and seller of an autoroll contract settle in step S66. When the contract rolls in step S67, the purchaser is obligated to purchase the IRS represented by the contract on the next effective date at the new model price, as determined by the pricing model of FIG. 4(a). Likewise, the seller of the autoroll contract is obligated to sell the IRS represented by the contract on the next effective date at the new model price, as determined by the pricing model of FIG. 4(a). Since the next effective date is closer to the date of maturity of the underlying notional bond, the model price will typically change, depending on the shape of the swap rate curve $C_i$. As the autoroll contract approaches maturity, the price will approach par, similar to a bond. It should be noted that the cash settled contract has no accrued interest; however, the autoroll contract has accrued interest because it has not settled, i.e., it is automatically rolled.

Note that the autoroll contract's roll can be traded as well. The roll is traded by buying the front month autoroll contract and selling the back month autoroll contract. Thus, even though every outstanding autoroll contract automatically rolls at the end of the front month, a dealer may wish to buy the front month contract and sell the back month contract in certain market conditions.

Between effective dates, steps S62, S63, S64 and S65 are performed, and on the reset date, steps S66 and S67 are performed to reset the price and automatically roll the autoroll contract.

If the autoroll contract has matured, then in step S68 the price at maturity is determined by the pricing unit 20a according to the pricing model of FIG. 4. Then, in step S69 the parties to the autoroll contract settle. Since the autoroll contract in this example is marked-to-market, the counterparties need only pay or receive the difference in the price at maturity and the previous day's closing price (or the last reset price if the contract is not marked-to-market). Note that steps S54, S56, S65, S66, and S69 are essentially the same since, in each of these steps, the model price is used to determine and settle the obligations of the counterparties. Preferably in these steps, the exchange nets the obligations of the counterparties to minimize the total number of transactions and the dollar amount of the transactions.

With the cash settled contract, a dealer or customer wishing to maintain a particular position must purchase or sell a new cash settled contract every time the settlement day arrives (e.g., every three months). With the autoroll contract, the same dealer or purchaser does not have to purchase a new contract because the autoroll contract automatically rolls on each effective date (e.g., every three months), and thus a new agreement between the counterparties is formed on each effective date. A counterparty to an autoroll contract can get out of an autoroll contract by either selling its position or by waiting until the autoroll contract matures in step S63.

Figure 5A:
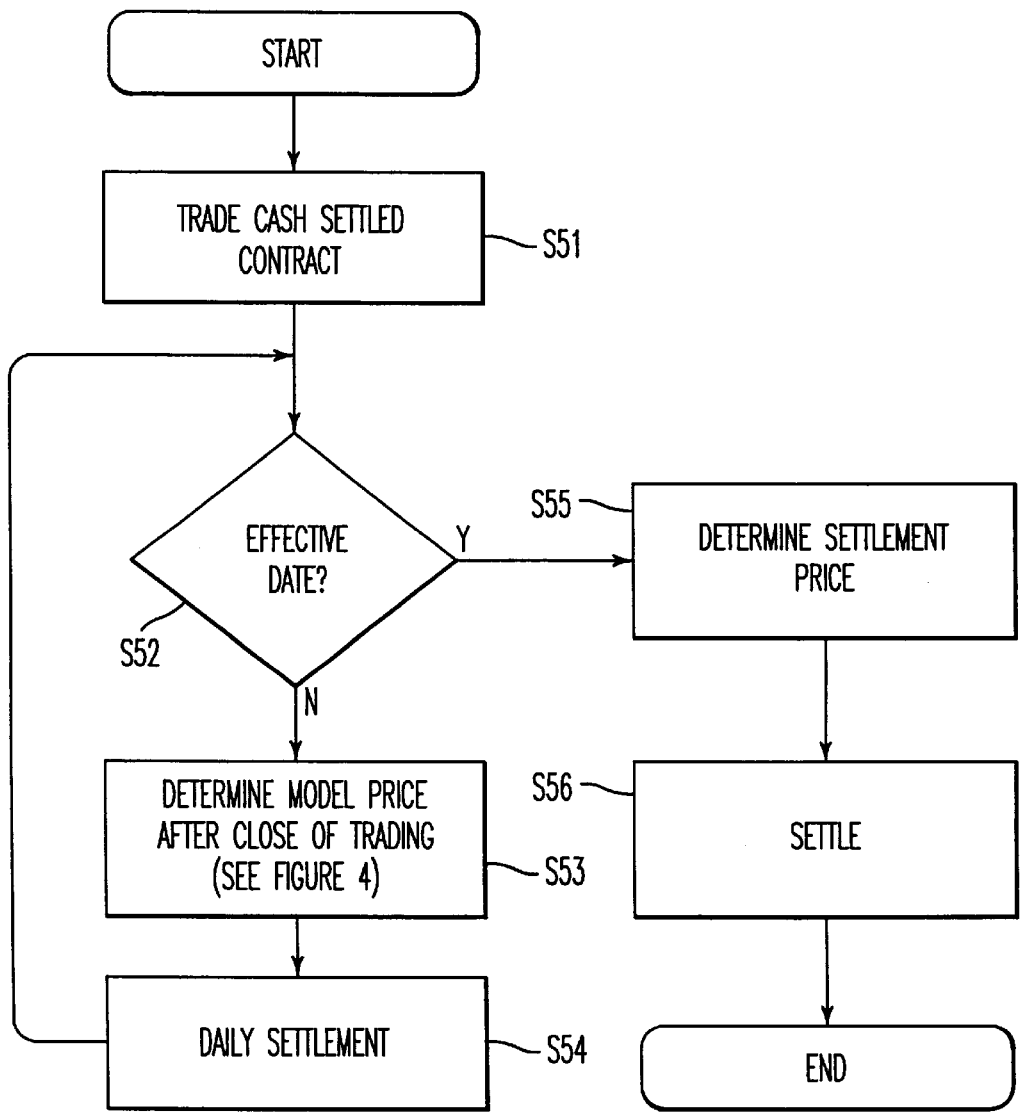
FIG. 5(a) is a flowchart showing the trading and processing of a cash settled contract priced according to the pricing model in FIG. 4(a)
Figure 5B:
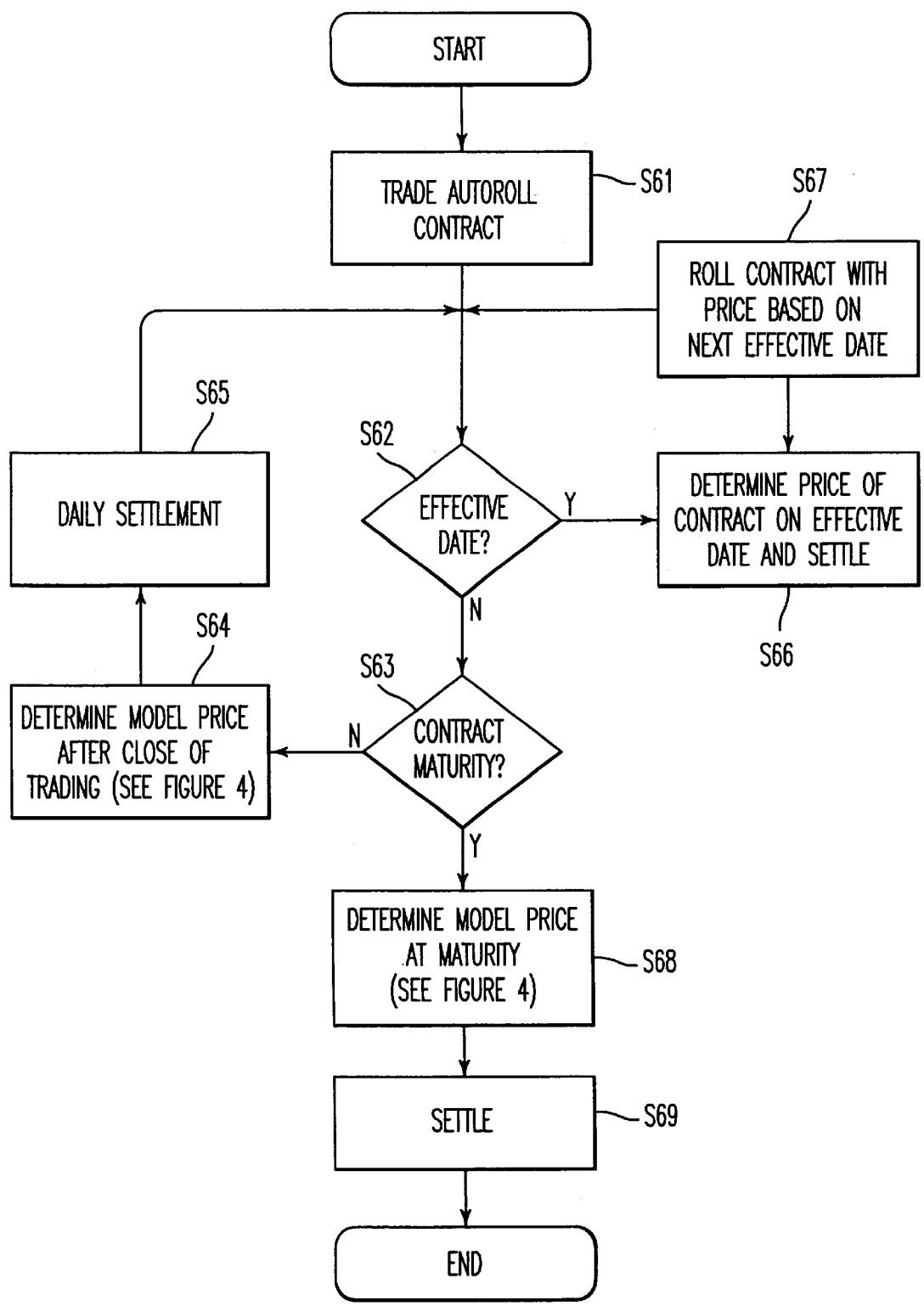
FIG. 5(b) is a flowchart showing the trading and processing of a contract similar to the one in FIG. 5(a), but with an autoroll feature that automatically rolls a party's position forward to the next effective date.

With the trading system of FIG. 2 or 3, both cash settled contracts and autoroll contracts can be freely traded in accordance with the methodology of FIGS. 5(a) and 5(b). For a selected notional cash flows, swap curve, notional maturity, and effective date, the settlement price of the contracts, as determined by the pricing model of FIG. 4(a), is the same. Thus, contracts having a the same notional cash flows, swap rate curve, notional maturity, and effective dates are homogeneous with respect to one another. The only thing that changes is the price at which dealers are willing to buy and sell the contracts. By selecting different notional cash flows, swap rate curves, notional maturities, and effective dates, different types of contracts can be defined to meet the different tastes of the dealers 2, 8, 10. Even the pricing model can be changed, to cause the price of the contract to behave differently in response to virtually any variety of economic inputs.

In accordance with the invention, the pricing model of FIG. 4(a) may be implemented to determine the price of a standardized contract. The transparent pricing of the inventive contracts permits them to be traded on an exchange like other standardized commodity (e.g., cash futures). Since the contracts are predefined by the selected notional cash flows, swap curve, notional maturity, and effective date(s), there is no need for dealers to negotiate terms and make a unique contract for each trade. Thus, the problems that exist in the conventional IRS market (discussed above) are reduced or eliminated by the present invention.

Since the inputs (notional cash flow, IRS curve, etc.) to the inventive contract cause the price of the contract to behave similar to an IRS, the invention effectively puts an IRS in commodity form. As discussed above, the inputs can be varied to suit the tastes of existing and potential traders of the inventive contract. For example, by using a relatively long notional maturity (e.g., 5 years and 10 years) and a relatively short period between settlement dates (e.g., 3 months), the inventive contract provides a short term instrument that emulates a long term IRS and that can be freely traded on an exchange in commodity form.

Figure 6:
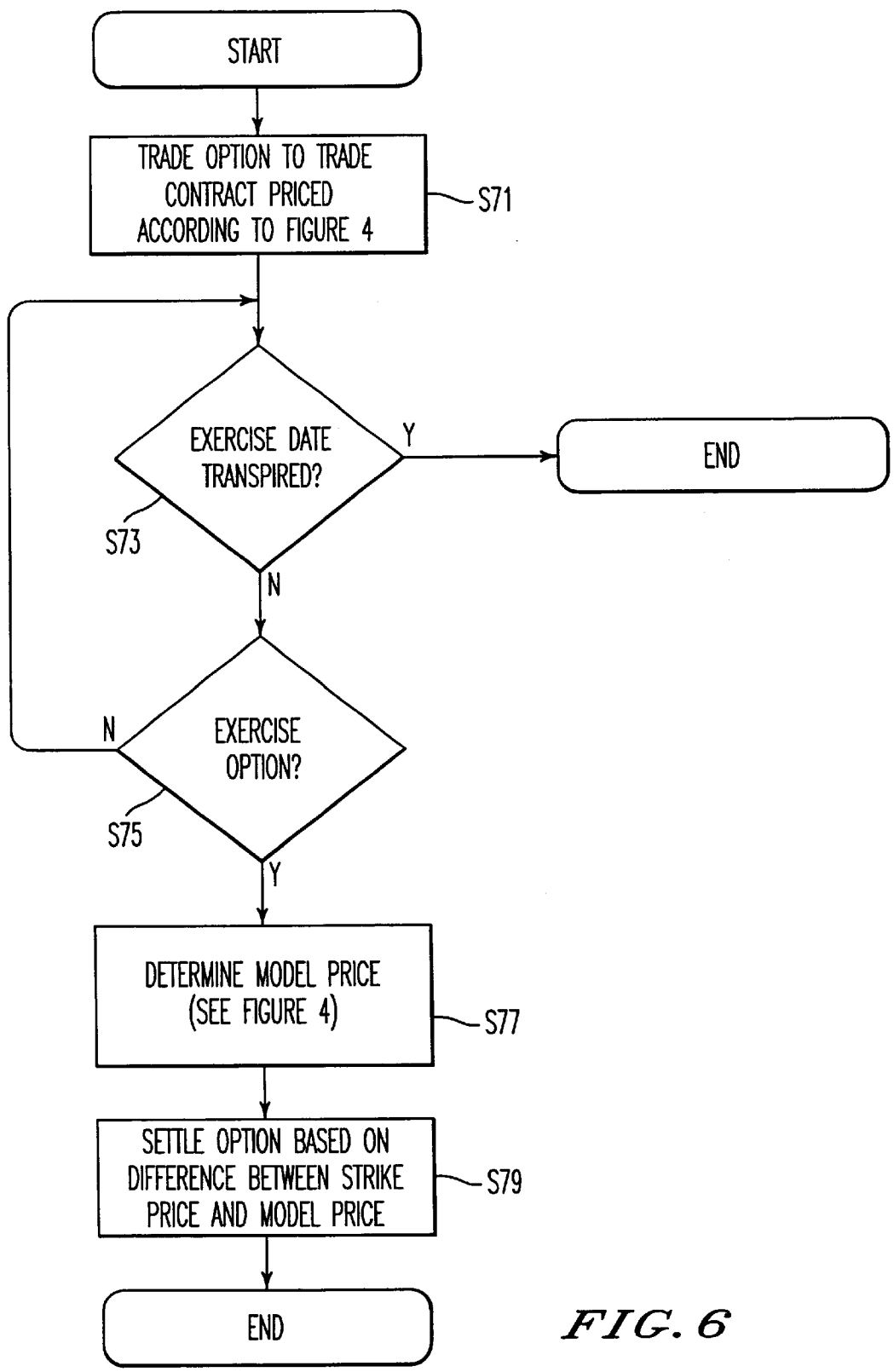
FIG. 6 is a flowchart showing the trading and processing of an option to trade a contract priced according to the pricing model of FIG. 4(a)

FIG. 6 is a flowchart showing how an option to trade a contract (for example the contract described in FIG. 5(a) or 5(b) ) is traded and processed. In step S71, the option is traded and a strike price (i.e., exercise price) and exercise date are set. In step S73, it is determined whether the exercise date has transpired. If the exercise date has transpired, then the process ends. If the exercise date has not transpired, then the option may be exercised in step S75. If the option is not exercised in step S75, then the process returns to step S73. If the option is exercised in step S75, then the price of the contract underlying the option is determined in step S77 according to the pricing model of FIG. 4(a). Then, in step S79 the option is settled based on the difference between the exercise price and the price determined in step S77 before the process ends. This processing and pricing of the option may vary in accordance with any desired set of rules for futures options. For example, the parties to the option may receive long and short positions, respectively, in the underlying contract when the option is settled in step S77.

Figure 7:
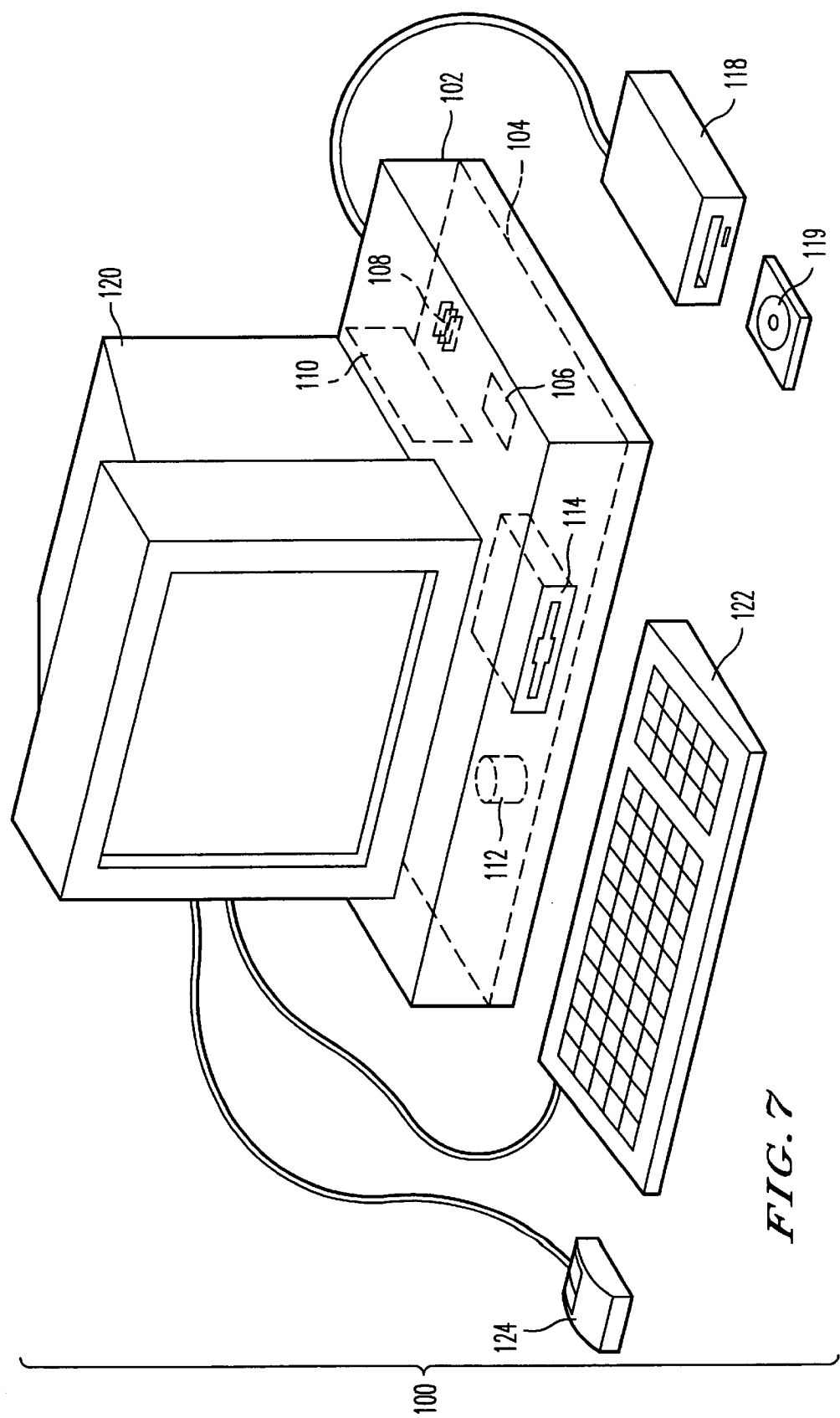
FIG. 7 is a block diagram of a general purpose computer 100 programmed according to the teachings of the present invention.

FIG. 7 is a block diagram of a computer system for executing trades between the dealers 2, 8, 10, determining the model price of the inventive contract, and/or automatically rolling the autoroll contracts on the effective dates. A general purpose computer 100 implements the method of the present invention, wherein the computer housing 102 houses a motherboard 104 which contains a CPU 106, memory 108 (e.g., random access memory (RAM), dynamic ram (DRAM), static RAM (SRAM), synchronous DRAM (SDRAM), flash RAM, read-only memory (ROM), programmable ROM (PROM), erasable PROM (EPROM), electrically erasable PROM (EEPROM), or any other desired memory), and other optional special purpose logic devices (e.g., application specific integrated circuits (ASICs)) or configurable logic devices (e.g., generic array of logic (GAL) or reprogrammable field programmable gate array (FPGA)). The computer 100 also includes plural input devices (e.g., a keyboard 122 and a mouse 124) and a display card 110 for controlling a monitor 120. In addition, the computer system 100 further includes a floppy disk drive 114; other removable media devices (e.g., a compact disc 119, a tape, and a removable magneto-optical media (not shown)); and a hard disk 112, or other fixed, high density media drives, connected using an appropriate device bus (e.g., a small computer system interface (SCSI) bus, an enhanced integrated device electronics (IDE) bus, or an ultra direct memory access (DMA) bus). Also connected to the same device bus or another device bus, the computer 100 may additionally include a compact disc reader 118, a compact disc reader/writer unit (not shown), or a compact disc jukebox (not shown). Although compact disc 119 is shown in a CD caddy, the compact disc 119 can be inserted directly into CD-ROM drives which do not require caddies. In addition, a printer (not shown) also provides printed listings of any of the inputs, intermediate values, and outputs associated with the model pricing units 20a, 20b, 20c, 20d, 20e (e.g., effective date, notional coupon, IRS curve source, maturity, discount factor, and the present value (PV) of the cash flows at various times).

As stated above, the system includes at least one computer readable medium used for storing computer instructions. Examples of computer readable media are compact discs 119, hard disks 112, floppy disks, tape, magneto-optical disks, PROMs (EPROM, EEPROM, Flash EPROM, etc.), DRAM, SRAM, SDRAM, etc. Stored on any one or on a combination of computer readable media, the present invention includes software for controlling both the hardware of the computer 100 and for enabling the computer 100 to interact with a human user. Such software may include, but is not limited to, device drivers, operating systems and user applications, such as development tools. Such computer readable media further includes the computer program product of the present invention for determining the model price of the inventive contract, executing trades between the dealers 2, 8, 10, and automatically rolling the autoroll contracts, in accordance with the description above or any of the examples below.

The computer code devices of the present invention can be any interpreted or executable code mechanism, including but not limited to scripts, interpreters, dynamic link libraries, Java classes, and complete executable program which when executed, perform the methods of the invention.

Thus, the present invention may be implemented on a machine, such as the general purpose computer 100, that transforms data (representing notional cash flows, swap curves, etc.) to achieve a practical application, for example, providing model prices for the inventive contract, executing trades of the inventive contract, determining settlement prices, and/or automatically rolling the autoroll contracts on the effective dates.

The present invention stores information relating to each contract in a database organized using data structures (e.g., records, arrays, and/or fields) contained in a memory such as a hard disk, floppy disk, optical disk, or RAM, for example. The stored information includes information for implementing the present invention, including information that relates to the notional maturity of the contract, the underlying notional cash flows, the swap rate, the effective date or dates, model prices, the bids of dealers, the account balance of the dealers, etc.

FIGS. 8, 9, 10A, and 10B are images of spreadsheet screens 30, 31, and 32, respectively, that illustrate how stored information may be organized into a data structure for implementing the present invention. The data structure embodied by FIGS. 8, 9, 10A, and 10B includes linked data fields for determining, among other things, the model price of the inventive contract. Alternatively, any other desired manner of implementing the data structure embodied by FIGS. 8, 9, 10A, and 10B may be equivalently implemented so that the desired functionality is achieved.

This invention includes the computer screen interface and the associated programming used to generate the interface which is used for interaction with people who are associated with and carry out the operation of the invention. For example, the inputs of the invention are entered through the user interface of the screen and the outputs are displayed on the screen and/or generated on printed paper.

The examples provided below provide various methods of implementing and/or practicing the present invention. Although the practice of the invention may vary, as shown by the examples above and below, the invention is readily adaptable to virtually any system of futures trading. Thus, the examples below may be altered and/or implemented using all or part of the inventive system, method, computer program product, and/or data structure described above. Likewise, the inventive system, method, computer program product, and/or data structure described above may be altered and/or implemented fully or partially in accordance with the examples below.

EXAMPLE 1

FIG. 8 shows a spreadsheet 30 that has been programmed to function as one of the pricing units 20a, 20b, 20c, 20d, 20e for implementing the pricing model shown in FIG. 4(a). Likewise, FIG. 9 shows a spreadsheet 32, and FIGS. 10A and 10B show a spreadsheet 32 for implementing the pricing model shown in FIG. 4(a) to determine pricing information for the autoroll contract. Note also, that the spreadsheets 30, 31 and 32 could also be used to determine pricing information for the cash settled contract since the front month price for the autoroll contract is the same as the settlement price (i.e., effective date price) for the cash settled contract. The spreadsheet can be implemented on any standard spreadsheet program executing on a general purpose computer such as the general purpose computer 100 shown in FIG. 7.

Referring back to FIG. 8, cell B5 shows the daycount which, in this case, is 360. The 30/360 daycount basis is used in Example 1 because that is the convention used for the German swap market, and the autoroll contract described here has a notional coupon. Cell B6 shows the swap settlement delay which, in this case, is two days since the coupon payment received from a notional bond is not received until two days after the listed coupon payment date. Cell B8 shows the last trading day of this particular autoroll contract. The last trading day is the last day that the autoroll contract can be traded before it rolls over for the next reset period (in step S67). The last trading day is also known as the effective date, and the month in which the last trading day occurs is called the effective month. The block of cells bracketed by cells A1 2 and D26 show the IRS curve used to determine the discount factors in step S4. In this case, the short-term rate is derived from LIBOR (months 1 through 9), and the long-term rate is derived from the ISDA Benchmark Swaps Rate fixing Cell H5 is the notional coupon which is derived from the underlying notional cash flow. In this case, the underlying national cash flow is a notional bond paying a coupon of 6% annually. Since the notional bond is a ten-year bond, the autoroll contract will mature in December of 2008, as shown in cells H7 and H8. The start date in H6 of Dec. 16, 1998, takes into account the two-day delay of the coupon payments for the underlying Bund. Cell F 13 shows the expiring front month, i.e., the next effective month. Cell G13 shows the effective date, accounting for the two-day delay, and cell H13 shows the remaining maturity of the contract in years from the effective date. Cells F15, G15, and H15 show, respectively, the back month (i.e., the first effective month after the next effective month), the back month effective date, and the remaining maturity in years from the back month effective date. Cell K5 shows the settlement price for the autoroll contract for the front month, and likewise, cell K8 shows the fair value of the autoroll contract on the front month effective date, in this case, 110.49. Cell K10 shows the calendar roll which is the difference between the front month EDSP and the back month fair value multiplied by 100. The calendar roll represents the fair value of the roll. That is, when the autoroll contract which is worth 111.03 on the effective date, is rolled over for the next front month and is priced at only 110.49, the calendar roll of 54 gives the value of the difference, i.e., the value of the roll.

Referring now to FIG. 9, the block of cells bracketed by cells A3 and B16 show the various swap rate sources to be used for each term. Column C, labeled "Maturity of Par Swap," lists the settlement of a par swap out to ten years. These are the dates when the price of the autoroll contract will be reset and the autoroll contract will be rolled over into the next term. Although there will be reset dates between 1 and 10 years out that are not shown, the ISDA benchmark swaps rate fixing does not show the interest rate for these intermediate terms. The interest rates for these intermediate terms could be interpolated using any known interpolation technique, such as linear interpolation, exponential interpolation, cubic spline interpolation, or exponential spline interpolation. Column E shows the rates corresponding to the various terms shown in column B. Since the maturity of the par swap (i.e., the reset date) may occur on a holiday or on a weekend, the reset date will actually occur on the first business day after the reset date if the reset date is on a holiday or a weekend. Column F shows the date on which the reset date will actually occur, and column G shows the corresponding day of the week. Column H is the accrual factor, as calculated in step S4 of FIG. 4(a). Again, the accrual factor is a fraction representing the number of days out of 360 from one cash flow date to the next. For example, since the reset date in the eighth year does not occur until Monday, Dec. 18, 2006, there are an extra two days in the reset term in year eight, and the accrual factor is 362/360=1.006. Column J lists the discount factors based on a term beginning from the front month effective date. The discount factors are determined in step 4 as described above with reference to FIG. 4(a). Column I represents an intermediate term ($A_j \times d_j$ in step S4) used to calculate the discount factors, $d_i$ (see FIG. 4(a)).

Referring now to FIGS. 10A and 10B, the spreadsheet 32 summarizes the data used to obtain the EDSP in cell K5 of the spreadsheet 30 shown in FIG. 8. The spreadsheet 32 includes a column that indexes the years to maturity. Column D shows the notional cash flow dates, accounting for the two-day delay, and column C shows the actual or following cash flow dates that account for whether the notional cash flow date occurs on a weekend or a holiday. Column D shows the accrual factor, as determined from column C. Column E lists the notional cash flows for each term of the autoroll contract. As noted above, these notional cash flows correspond to an underlying interest rate, preferably a fixed rate of interest such as that generated by a particular government bond, for example, a Bund. Column F shows, for each reset term, the adjusted cash flows. For each year, the adjusted cash flow is the corresponding accrual factor multiplied by the corresponding notional cash flow (i.e. column D times column E). Column G shows the discount factors from the front month effective date, which are taken from column J of the spreadsheet 31. Column H is the PV of the adjusted cash flows in column F. The PVs in column H are calculated by multiplying the discount factors in column G by the corresponding adjusted cash flow in column F, for each year. Column I is the PV of the adjusted cash flows after the front month. In FIG. 10B, columns H and I are the same because no coupon payments occurred between the front month contract and the back month contract. Column J shows the PV of the cash flow for each year as of the back month effective date. The values in column J are estimates, obtained using linear interpolation to predict the future ISDA benchmark swap rate fixing. Any interpolation could be performed to derive these rates such as exponential, cubic spline, linear, or exponential spline interpolation, to mention but a few types of interpolation. Column K lists the accrued interest at the front month effective date for each term. This is so the accrued interest can be subtracted from the EDSP (cell K5 of the spreadsheet 30 shown in FIG. 8). Column L shows the accrued interest for the back month effective date. Since there will be one notional cash flow before the back month effective date, then the interest that would have accrued at 6% over three months (since the back month effective date is three months after the front month effective date) is stored in cell L4. Column L shows no accrued interest below cell L4 because the reset dates (i.e., effective dates on which the contract is automatically rolled coincide with payment dates of cash flows or predefined cash flows) occur on the IMM dates. The EDSP in cell K5 of spreadsheet 30 is the sum of the PVs of all the cash flows in column I of spreadsheet 32 minus the sum of all the accrued interest at the front month effective date (in this case, zero). The back month fair value in cell K8 of spreadsheet 30 is the sum of the PVs of all of the cash flows after the back month in column J of spreadsheet 32, minus any accrued interest occurring after the back month effective date (in this case, 1.516667). Again, since the PV of cash flows after the back month effective date uses interpolated interest rates, the back month price of the autoroll contract is termed the back month "fair value" rather than the back month EDSP.

EXAMPLE 2

Figure 11B:
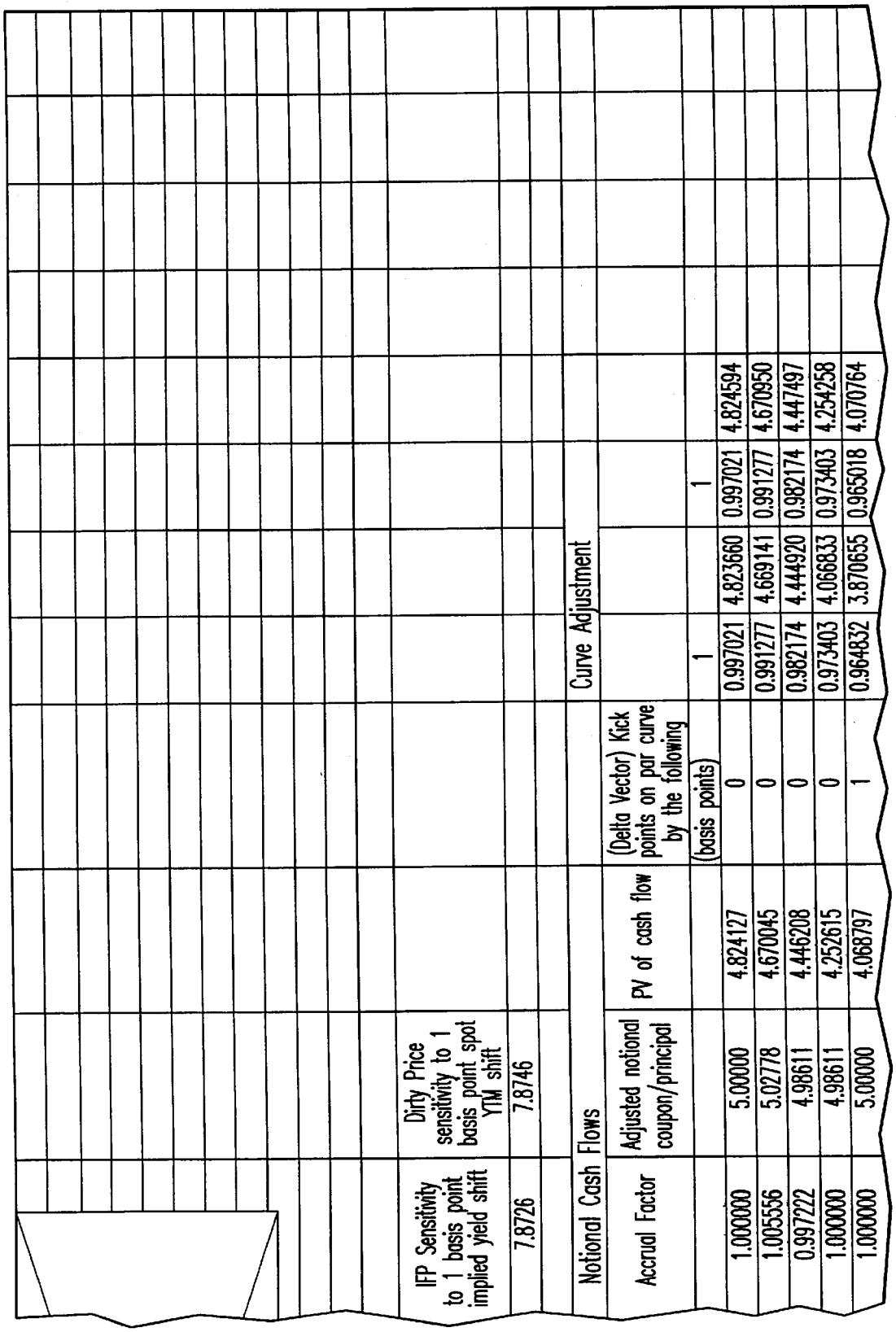
FIG. 11 shows how FIGS. 11A, 11B, 11C, and 11D collectively form an image of a spreadsheet screen 34 that illustrates an alternative manner of implementing the present invention with a standard spreadsheet program.
Figure 11C:
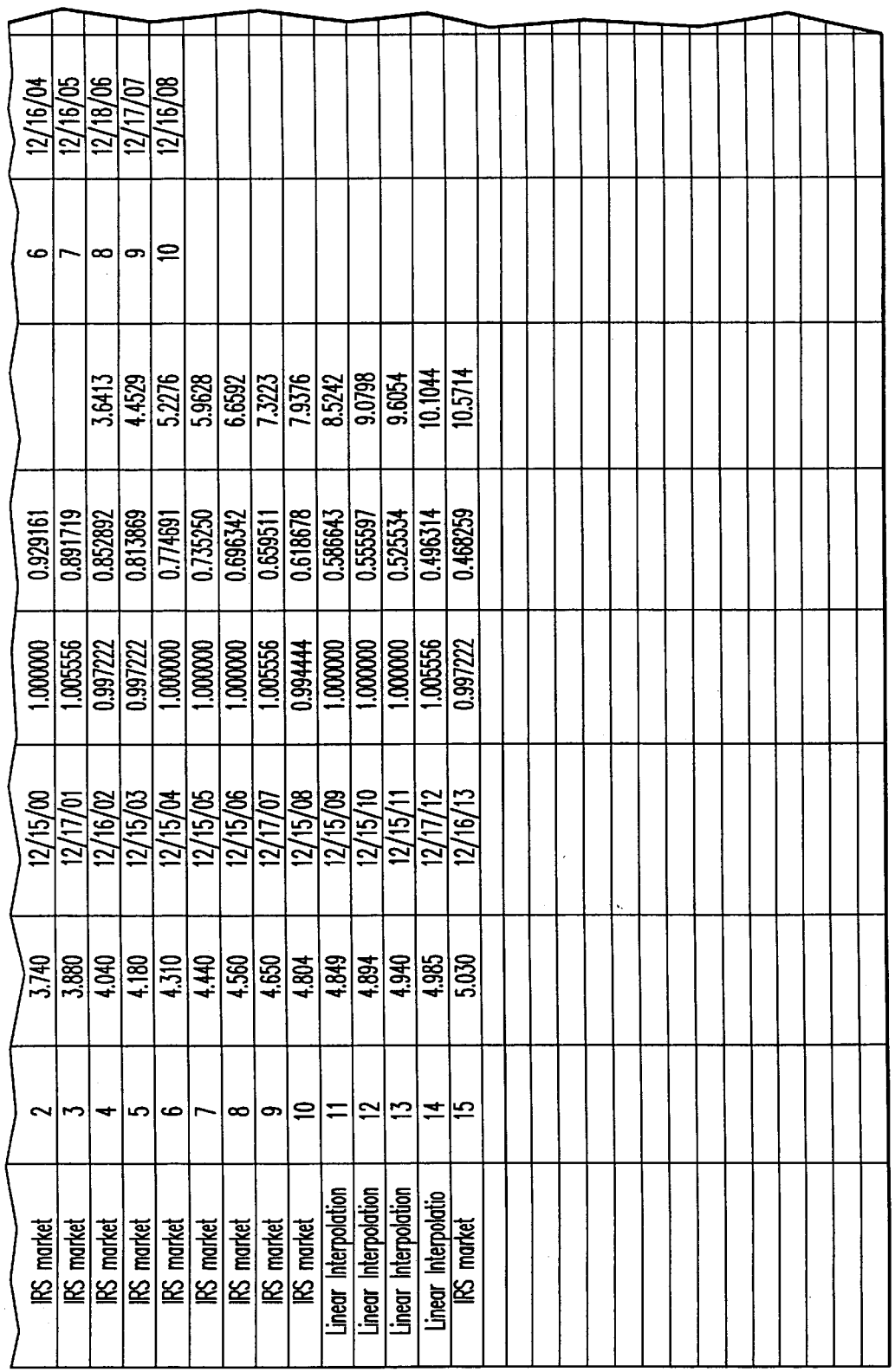
Figure 11D:
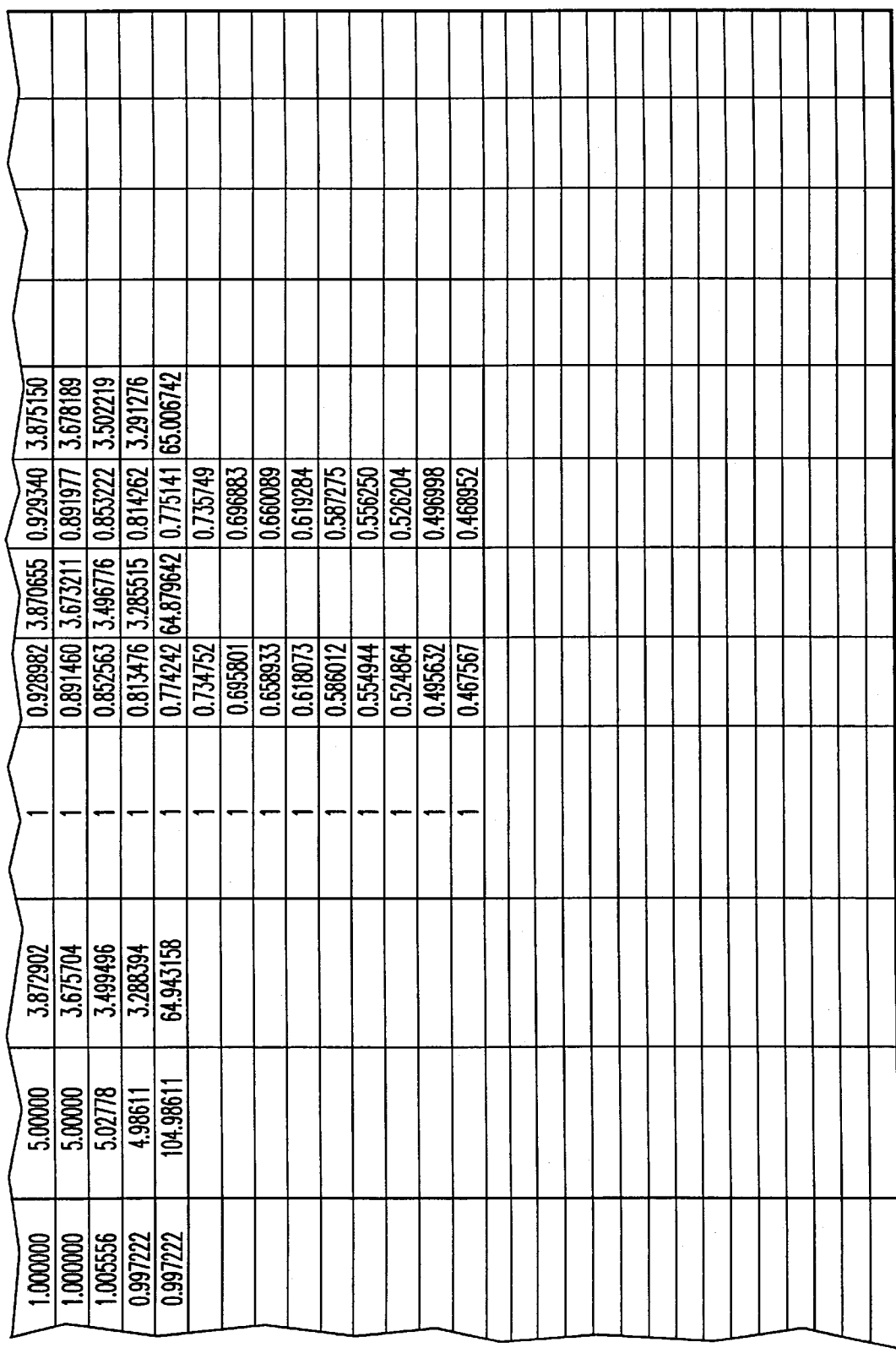

FIG. 11 shows how FIGS. 11A, 11B, 11C, and 11D collectively form an image of a spreadsheet 34 that illustrates how a standard spreadsheet program can be used to implement the present invention, including calculations for futures yields based on the swap curve shown in Table 1. Referring to the spreadsheet 34, the "Dirty Price (present value) as of trade date" that is equal to the present value of a series of future cash flows, or the clean price of a bond plus its accrued interest. The "Implied Futures Price" is the present value of a series of cash flows which commence at some future date, using an implied financing rate between the present date and the future date. The "Implied Financing Rate" is the financing rate used in any present value calculations, usually from the present to some date in the future. The "Implied YTM/par swap rate at Expiry" is the yield to maturity (YTM) implied by a particular yield (swap) curve, or the present value of a series of cash flows calculated to a future date. The "Implied spot YTM" is the YTM of a series of cash flows, or the present value of these flows calculated to today. The "Delta Vector (Change in IFP)" is the price sensitivity of the cash settled contract to a 1 basis point parallel shift in the swap curve. The "IFP sensitivity to 1 basis point implied yield shift" is the price sensitivity of a cash settled contract which settles at some point in the future, or the value of 1 basis point on that particular cash settled contract. The "Dirty Price sensitivity to 1 basis point spot YTM shift" is the price sensitivity of a cash settled contract which settles today, or the value of 1 basis point on that particular cash settled contract. The functions for the various outputs of the spreadsheet 34 are listed in Appendix A.

The inventive contracts may be used as an instrument in basis trading. The cash settled contract provides an attractive alternative to the use of OTC swaps and/or Euro-deposit contracts for trading and hedging the basis risk across sovereign and non-sovereign debt. Conventionally, a trader wishing to trade the basis between Bunds and medium term interbank offered rates could choose to purchase the Bund futures contract and pay fixed on an equivalent risk weighted amount of IRSs. Alternatively, with the advent of cash settled contracts valued according to the present invention, the same trader could purchase the Bund futures contract against selling an equivalent risk weighted amount of cash settled contracts. For example, if a trader believes that the current basis between Bunds and medium term interbank offered rates will widen, then the trader could buy Bunds and sell cash settled contracts valued according to the present invention.

Figure 1:
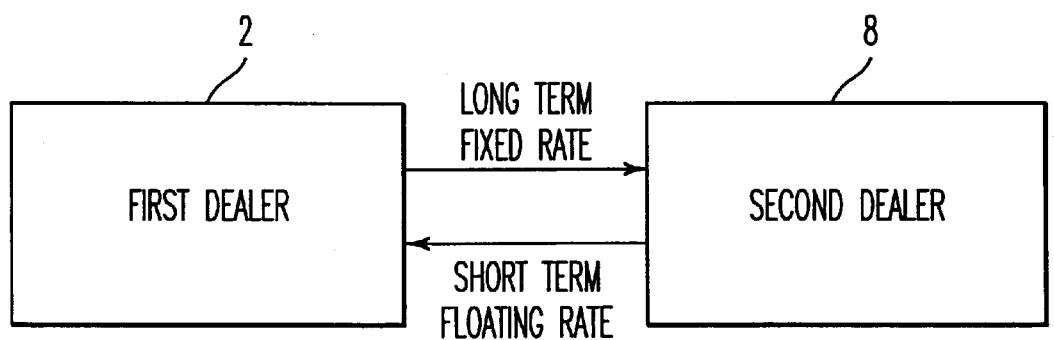
FIG. 1 is a block diagram illustrative of a conventional IRS transaction between the first dealer 2 and the second dealer 8.

With the spreadsheet of FIG. 1, given a cash settled contract with an effective date of Dec. 15, 1998, that is based on an underlying ten year Bund, if that contract is trading at 112.04, the implied future's yield is 4.293% (based on assumed delivery of the cheapest to deliver bond, 6% Jul. 4, 2007). The price on the effective date is calculated as the coupon price at the trade date times the contract factor of the underlying Bund. Thus, the price at the effective date is less than any bond in the universe of present deliverable baskets. Given that an cash settled contract is trading at 101.555 for an implied yield of 4.801% (given the IRS yield curve indicated in Table 1, below). Thus, the yield spread across both instruments is 4.801–4.293=0.508%.

Table 1 shows an exemplary yield curve in which the swap rates for 1, 3, 6, and 9 months are taken from the LIBOR rate, and the swap rates for years 1–10 and 15 are taken from the IRS market, e.g., the ISDA benchmark swaps rate fixing.

TABLE 1

| Source | Term, Year(s) | Rate, Percent |
|---|---|---|
| LIBOR | 1/12 | 3.470 |
| LIBOR | 3/12 | 3.520 |
| LIBOR | 6/12 | 3.590 |
| LIBOR | 9/12 | 3.590 |
| IRS mkt | 1 | 3.635 |
| IRS mkt | 2 | 3.740 |

TABLE 1-continued

| Source | Term, Year(s) | Rate, Percent |
|---|---|---|
| IRS mkt | 3 | 3.880 |
| IRS mkt | 4 | 4.040 |
| IRS mkt | 5 | 4.180 |
| IRS mkt | 6 | 4.310 |
| IRS mkt | 7 | 4.440 |
| IRS mkt | 8 | 4.560 |
| IRS mkt | 9 | 4.650 |
| IRS mkt | 10 | 4.804 |
| IRS mkt | 15 | 5.030 |

The basis point risk value of the Bund contract, based on existing market conditions, can be compared to that of the cash settled contract in order to identify the appropriate risk weighting of one versus the other. For example, at a Bund contract price of 112.04 and a delivery on Dec. 10, 1998 of the current cheapest to deliver bond, at its factor adjusted price of 111.99104, the contract has a basis point risk value of 7.573 (in deutschemarks (DM)). Given the yield curve in Table 1, the cash settled contract has a basis point risk value of DM 7.873. The risk ratio of contract contracts to Bund contracts is thus 7.573/7.873=96.2%.

If the Bunds strengthens by 10 basis points and the contracts remain unchanged (based on a Bund contract amount of 1,000 with a contract value of DM 250,000), this would result in a profit to the trade of (1,000×250,000×0.07573)=DM 1,893,250.

EXAMPLE 3

The use of the inventive contract as a swap dealer hedging instrument will now be described. With the inventive cash settled contract, swap dealers can avoid the basis risk inherent in hedging their swap books with government bonds and related futures contracts by using contracts as a hedging alternative. For example, a swap dealer receives fixed on a DM 100 million 8 year Deutschmark IRS at 4.56%. The swap has a basis point risk value of 6.578. The 10 year cash settled contract has a basis point risk value of 7.873. The swap dealer therefore uses a hedge ratio of 84.5%. As the contract has a contract value of DM 250,000, the dealer would sell 338 contract contracts ((100 million/250,000)*0.845) against the swap position. There is a small amount of yield curve risk inherent in this hedging strategy that results from the sale of a 10 year instrument, i.e., the contract, against a long position in an 8 year instrument, i.e., the IRS. However, such risk is often present when using "on the run bonds" to hedge IRSs. Furthermore, the basis risk inherent in a bond hedging strategy is avoided through the use of contracts.

EXAMPLE 4

The use of the inventive contracts to hedge corporate bonds will now be described. The inventive cash settled contract can be used as a hedging instrument for both individual corporate bonds and corporate bond portfolios. Whereas customers often require exact cash flow matching of assets and liabilities in their investment portfolios, this requirement is rare in the dealer community.

Often corporate bond inventories are hedged by dealers in a manner similar to the way swap dealers have traditionally hedged their derivative portfolios, namely, by shorting government securities and related futures contracts. This has historically left both the swap dealer and the corporate bond dealer with basis risk across these different instruments. The corporate bond trader is exposed in such a hedging strategy to a widening in corporate yield spreads to the underlying government curve. This was all too evident in late August 1998 as the widening in global credit spreads has resulted in major losses in dealers' government bond hedged corporate inventories.

Even if corporate spreads are widened significantly relative to their underlying government curves, the widening in quality credit spreads relative to the LIBOR curve may be less accentuated. In this situation, where the widening in quality credit spreads to the LIBOR curve (or any other floating rate curve) is less accentuated than the widening of corporate spreads to their related government curves, the inventive contracts provide a hedging instrument. By using contracts to hedge corporate securities, the dealer aligns his basis risk to that of medium term interbank rates which will most likely provide more correlation in the event of macro credit shocks. For example, a corporate bond trader buys DM 100 million Siemens 5.5% March 2007 at 105.87% for value on Sep. 8th, 1998, with a basis point risk value of 7.16. With the availability of contracts, the trader sells a 10 year December cash settled contract with a basis point risk value of 7.873 at a ratio of 0.909; this results in 364 ((100 million/250,000)×0.909) cash settled contracts being sold to hedge the purchase of DM 100 million Siemens 5.5% March 2007.

EXAMPLE 5

In Example 5 the autoroll contract embodies a contract to pay (or receive) the Treasury coupon and receive (or pay) the 3-month LIBOR rate (or any other floating rate index) until the maturity of the particular Treasury which is the subject of the respective contract. Every quarter, on the IMM effective date, all outstanding autoroll contracts will settle accrued interest and roll to the next IMM effective date without actual or physical delivery. Potentially every Treasury, domestic and foreign, would have its own autoroll contract and/or cash settled contract valued according to the present invention.

The final close the each autoroll contract of Example 5 is the IMM effective date which first occurs in the last year of a particular autoroll contract. Rather than deliver the Treasury for cash, settlement would be for cash at a price that equates the yield on the Treasury to LIBOR for the remaining days to its maturity.

For each subsequent quarter, the three month LIBOR will be set on the last trading day of the IMM Eurodollar contract as determined by the British Banker's Association and displayed on a remotely accessible source, preferably a private pricing vendor (e.g., Dow Jones Markets) at 11:00 a.m., Greenwich mean time. Both the LIBOR interest and the Treasury coupon interest will be settled each quarter. Accordingly, autoroll contracts will trade flat on each IMM effective date.

Margining occurs daily, and intraday as necessary, based on industry accepted quotes and CBOT risk standards. Trading can take place in a trading pit or over a screen-based system via registered brokers.

EXAMPLE 6

The sixth example describes yet another variation of the autoroll contract. Underlying the contract embodied by the autoroll contract, are a series of notional cash flows which are priced off the IRS yield curve to the next IMM effective date. The notional cash flows can be modeled off a liquid government bond, for example, or a notional bond may be created which would fulfill a similar function. The advantage of basing the notional cash flows on a benchmark, however, ensures that current benchmark yield levels are matched and that the contract is more attractive to bond traders, since bond traders are familiar with the bond market conventions, i.e., accrued interest calculation, payment dates, price to yield calculations, etc., and trading tools are readily available of bond traders to trade the yield basis as well as for hedge funds wanting to trade asset swaps.

The contract expires at the quarterly IMM effective dates and results in a re-assigned position in the following expiry month. However, provisions in the contract design can be built in to allow for a cash settlement in pre-defined circumstances. At any point in time two consecutive effective months are listed.

Conceptually, the autoroll contract is very similar to that of a bond futures contract and the price behavior of the IRS futures contract will behave in much the same way as a bond futures contract. The main differences between an autoroll contract and a bond future are that the autoroll contract is priced against one notional bond, has an automatic rollover, has no physical delivery and price factor adjustment, and its price is determined based on the IRS yield curve.

The contract is based on the notional cash flows of an existing bond. The absence of a basket of deliverable bonds removes the optionality embedded in the bond contract. The price is a clean function of the remaining cash flows and the applicable IRS curve.

The contract is designed to have a rolling settlement at expiry. For example, outstanding March contracts are automatically rolled into June contracts at the March expiry date. The duration of each contract would therefore get shorter through its lifetime is similar to a bond or an IRS. The rollover price at each expiry are established through a defined pricing model and the IRS yield curve as input source, using for example, the pricing model described in FIG. 4(a). However, since there are two contracts listed at any one point in time, one could also choose to trade the rollover as is conventionally done with bond futures.

The absence of a physical delivery process avoids delivery defaults, price factor adjustments and the possibility of squeezes of specific issues, which influences the pricing. The contract, if not traded out, is either automatically rolled into the following effective month or, if required, cash settled. The contract integrity is ensured by the fact that the contract converges at the IMM effective date prior to the expiry of the notional bond to 100 plus the last coupon payment discounted by the applicable LIBOR rate. If a contract is cash settled prior to this date, the integrity of the contract relies on the acceptance of the chosen settlement model and the feed of the model.

The underlying IRS market is not traded in a securitized form similar to the deposit market. The pricing of n IRS (and subsequently, the inventive autoroll contract) is based on yield curve assumptions and discount functions derived from a previously established yield curve. This information permits the determination of the PV of future cash flows and the evaluation of customers' positions. To provide coverage across the swap yield curve, different contracts are listed against separate bonds with maturities at various points on the yield curve. These bonds need not necessarily be from the same issuer.

The contract should be complemented by options and customized trading facilities to support the interaction of different markets (e.g., a Basis Trading Facility (BTF)) and large order facilities. An extension of the product to other currencies may be accomplished by one of ordinary skill in the art without undue experimentation. In order to implement the invention in other currencies, the price of the contract can be converted to other currencies based on the exchange rate, and/or the underlying notional cash flows can be based on a bond issued by the government corresponding to the currency used to specify the price of the contracts.

During the contract's existence, the contract standard is a rolling settlement based on the Exchange Delivery Settlement Price. The exchange delivery settlement price (EDSP) is based on the pricing model, which uses DM swap interest rates compiled by the British Bankers' Association at 11:00 a.m., London time, on the last trading day. The pricing model interpolates the rates and determines discount factors for the notional cash flows.

The pricing of the contract is based on a series of cash flows, which are discounted to a particular date. To discount the cash flows, an autoroll contract dealer uses a model pricing unit (e.g., the second dealer 8 uses the model pricing unit 20d) that incorporates the pricing model to build a par yield curve based on traded rates and convert the par yield curve, via bootstrapping, into a zero coupon curve. Next, the autoroll contract dealer interpolates between the different rates and determines the discount factors. The cash flows are multiplied with the discount factors to obtain the price of the autoroll contract for today. In order to determine the price to the next IMM effective date, the price of the autoroll contract today is divided by the discount factor for the time period extending from today to the next IMM value date.

The series of remaining cash flows at any IMM effective date is defined by the remaining notional coupon payments of the bond on which the contract is modeled. The discount factors should be applied for the value date of the coupons. Accordingly, for bonds, the discounte factors are applied for T+2, i.e., two days after the trade date.

The pricing units' 20a, 20b, 20c, 20d, 20e calculation of the discount factors is based on a par yield curve determined from traded and liquid rates which could be derived from short term interest rate (STIR) futures, IRSs, and bonds, for example. It is preferable to have a homogenous data source and a coherent credit for the rates used. Next, the par rates are converted into zero coupon rates. Deposit rates with maturity less than a year, e.g., LIBOR rates, are effectively zero rate. For yields that are based on maturities beyond one year, the bootstrapping method is used to calculate zero rates. Bootstrapping is an iterative process in which, beginning with the shorter maturities, the model pricing units 20a, 20b, 20c, 20d, 20e calculates zero coupon rates. The basic principle of bootstrapping is to divide the PV of the cash flows by the future value of the cash flows at expiry. In this process, the discount factor for year one is used to determine the zero rate for year two, the discount factor for year two is used to determine the zero rate for year three, and so on, for the following years. The determination of discount factors is based on the principle that the discount factor compounded by the rate powered by the number of years will deliver a future value of one.

After determining the zero rates as knot points, interpolation must be performed between the zero rates in order to calculate discount factors for every possible cash flow. Optionally, interpolation can be performed between the different discount factors. It is market standard to base interpolation on zero rates because a smoother curve results. Linear interpolation, exponential interpolation, exponential spline interpolation, or cubic spline interpolation may be used, for example. Even though linear interpolation provides acceptable results when applied to a normally shaped yield curve, linear interpolation may yield erratic results with oddly shaped yield curves, e.g., yield curves having kinks. Exponential interpolation, cubic spline interpolation, and exponential spline interpolation, if used, may provide curves that are better rounded and smoother than the curves produced by linear interpolation. The mathematical principle behind exponential, exponential spline, and cubic spline interpolation is based on the assumption that one can take more than two knot points into consideration when interpolating and determining the curvature of a function. However, for certain yield curves, exponential, exponential spline, and cubic spline interpolation tend to exaggerate swings in the yield curve.

For the settlement, one has to differentiate between the daily settlement price used for margining and the settlement at expiry of the contract (applicable for rollover and cash settlement). The daily settlement could be based on either traded prices, as conventionally done in other contracts, or on a model price. It may be desirable to settle actively traded contracts on traded prices. However, the pricing units 20a, 20b, 20c, 20d, 20e can be run to cross-check settlement prices and to settle contracts that are not actively traded.

The settlement price at expiry is significant since it is the basis for the automatic rollover and cash settlement of some contracts. The model price output by the pricing unit 20a of the futures exchange 11 may be used to determine the settlement price at expiry. Through this approach it can be ensured that the rollover prices are coherent, considering the underlying rates. Both the underlying rates and the pricing model should be transparent and publicly available in order increase public confidence in the product, i.e., the contract.

The settlement model basically follows the same steps as the pricing model described above in the discussion of FIG. 4(a). The pricing units 20a, 20b, 20c, 20d, 20e model the notional cash flows, constructs a par yield curve based on traded rates, converts the par yield curve into a zero coupon curve, performs interpolation between the zero rates, determines the discount factors, and multiplies the notional cash flows with the discount factors to determine the roll over settlement prices.

The notional cash flows are modeled off an existing bond while the coupons payments are discounted using a skip day convention (i.e., a T+2 value date). Table 2 shows the notional cash flow model for a bond bearing 6% coupons and that matures Jun. 4, 2007.

TABLE 2

| Coupon date | T + 2 | Notional cash flow | Last expiry in which the cash flow is included |
| --- | --- | --- | --- |
| Thursday 04 June 98 | Monday 08 June 98 | 6.00 | Mar 98 |
| Friday 04 June 99 | Monday 07 June 99 | 6.00 | Mar 99 |
| Sunday 04 June 00 | Tuesday 06 June 00 | 6.00 | Mar 00 |

TABLE 2-continued

| Coupon date | T + 2 | Notional cash flow | Last expiry in which the cash flow is included |
|---|---|---|---|
| Monday 04 June 01 | Wednesday 06 June 01 | 6.00 | Mar 01 |
| Tuesday 04 June 02 | Thursday 06 June 02 | 6.00 | Mar 02 |
| Wednesday 04 June 03 | Friday 06 June 03 | 6.00 | Mar 03 |
| Friday 04 June 04 | Monday 07 June 04 | 6.00 | Mar 04 |
| Saturday 04 June 05 | Monday 06 June 05 | 6.00 | Mar 05 |
| Sunday 04 June 06 | Tuesday 06 June 06 | 6.00 | Mar 06 |
| Monday 04 June 07 | Wednesday 06 June 07 | 106.00 | Mar 07 |

The knot points of the par yield curve are based on money market rates and IRS rates available in the market at 11:00 a.m. London time. For the money market rates two options are available. Either LIBORs from one-week to twelve-months are taken or the Euromark strip for the first two years (including a stub adjustments) is chosen. A stub adjustment is advisable in order to capture the steepening of the yield curve at the short end, especially when cash flow occurs in the first three months after the IMM effective date at which the contract is valued. The stub adjustment would cover one-week, one-month and two-month LIBORS. The strip of Euromarks may deliver a better interpretation of the curvature in maturities up to two years since it is actively used and recognized by IRS market participants. For the IRS rates, an acceptable fixing can be selected.

The conversion of the par rates is based on the bootstrapping methodology. The basic methodology assumes that, for each future payment of a coupon security, there exists a zero coupon rate that discounts the payment to its PV. These rates constitute the zero coupon yield curve. The points along the zero coupon yield curve represent the yield to maturity of a zero coupon bond for the appropriate maturity rate. It is possible to estimate the zero coupon curve from the existing par yield curve. This estimation entails calculating equilibrium zero rates that value each component of the cash flow of a coupon security in an internally consistent fashion, so all par bonds would have the same value as the sum of their cash flow components.

The zero coupon rates are calculated using bootstrapping. Given that one year bonds and two year bonds are traded at par coupon levels (yield to maturity) of 7% per year and 8% per year, respectively, the following calculation are used to determine the respective zero coupon rates. Both bonds are traded at 100. The one-year bond implies a zero rate of 7%, which is the same as the yield to maturity. However, the two year zero rate has to be higher than 8% in order to maintain the equilibrium price of 100 for the two year bond yielding 8%. Table 3 shows the results of pricing.

The cash flows and the current value of the security (100 for par yields, for example) are known. Since the one-year rate is also known, one can easily determine the PV of the first coupon payment of the two-year bond. This PV subtracted from the current value of the bond, i.e. 100, delivers the value of the discounted cash flows in year two. Based on the elimination of the interim cash flows, one can calculate the applicable two-year zero coupon rate, $z_2$.

Mathematically, the equation is solved as follows:

$$100 = \left(F * \frac{1}{(1+z_1)}\right) + \left(F * \frac{1}{(1+z_2)^2}\right) + \left(100 * \frac{1}{(1+z_2)^2}\right) \quad (4)$$

This can be solved for $z_2$ as follows:

$$d_2 = \frac{100 - \sum_{i=1}^{1} c * d_i}{100 + c} = 0.85670 \quad (5)$$

$$z_2 = \left(\frac{1}{d_2}\right)^{\frac{1}{2}} - 1 = 8.04\% \quad (6)$$

In a similar way, zero rates, $z_x$ for each subsequent maturity can be derived interactively.

$$d_x = \frac{100 - \sum_{i=1}^{x-1} c * d_i}{100 + c} \quad (7)$$

$$z_x = \left(\frac{1}{d_x}\right)^{\frac{1}{x}} - 1 \quad (8)$$

Regardless of the interpolation method used, the futures exchange 11 reserves the right to adjust the curvature if the pre-determined methodology shows obvious misinterpretations of the curve.

The calculation of the discount factors, d, for each day, i, is determined as follows:

TABLE 3

| Maturity, x | Par yield | Principal | Coupon, F | Zero rate | Discount factor, d | Discounted cash flows | formula for d |
|---|---|---|---|---|---|---|---|
| 1 | 7.00% |  | 8 | 7.00% | 0.93458 | 7.4766 | $1/(1 + z_1)$ |
| 2 | 8.00% | 100 | 8 | 8.04% | 0.85670 | 92.5234 | $1/(1 + Z_2O)^2$ |
|  |  |  |  |  |  | 100.00 |  |

$$d_i = \frac{1}{(1+z_i)^{\frac{i}{365}}} \quad (9)$$

Lastly, the notional cash flows are multiplied by the corresponding discount factors, and the resulting discounted values are summed to provide the rollover settlement prices.

The autoroll contract in Example 6 is traded on an electronic trading platform, such as APT or LIFFE CONNECT, which allows the trade of autoroll contracts to benefit fully from the advantages of an automated trading environment. Optionally, trading facilities other than the central market place (i.e., the futures exchange 11) may also be provided, e.g., block trading, integrated trading strategies, etc. Such trading facilities serve to lower market access barriers.

Obviously, numerous modifications and variations of the present invention are possible in light of the above teachings. For example, it is possible to mix and combine any of the features in the examples above to suit the tastes of a variety of market participants and to adopt to any system of trading. It is therefore to be understood that within the scope of the appended claims, the invention may be practiced otherwise than as specifically described herein.

GLOSSARY OF TERMS

The definitions below are provided solely for the convenience of the reader. Since variations and alternatives exist for most of the definitions below, the definitions below may only be accurate and/or relevant in particular contexts. Accordingly, these definitions are not intended to be exclusive of other acceptable meanings, but are intended only to familiarize the lay person with financial terminology. Thus, the phrases listed below also may be interpreted to have their dictionary or ordinary use definitions.

Because the present invention is adaptable to virtually any trading system, any convention, and any set of trading rules, the definitions below in no way limit the intended scope of the invention which is unaffected by the adoption of one particular definition over another.

A "30/360 daycount basis" assumes that there are 360 days in a year and 30 days in each month.

"ACT/360" is a day count convention used for many bonds.

"Adjusted cash flows" are raw cash flows that are adjusted according to some algorithm or other process.

An "asset" is an item of value owned.

An "assignment" is the transfer of rights or property.

The "back month contract" is the contract delivered immediately after the front month contract.

The "back month effective date" is the next effective date after the front month effective date.

"Basis" is the difference between the spot price and the futures price of an asset.

A "basis point" is 0.01 per cent. If an instrument is priced using a discount yield and a contract size of $1,000,000, a one basis point movement in the interest rate results in a price change of $25.00.

The "basis risk" is the risk that results when the two sides of a hedge do not move together.

A "basis trade" is a paired long/short trade, where both positions are of similar tenor, in like instruments which are meant to have a strong, but not exact, correlation.

A "basket of deliverable bonds" is a list of bonds that are eligible for delivery versus a bond futures contract.

A "bilateral netting agreement" is an agreement between two offset all of their obligations to each other so that only the net result of their total obligations to one another is exchanged.

"Blind brokering" is the anonymous brokering of financial instruments, so that the counterparty's identity is unknown to other market participants.

"Book entry security" is any security which exists only in electronic format.

"Bootstrapping" is a recursive process by which future interest rates can be calculated from earlier interest rates. For example, bootstrapping may be used to determine the zero coupon rate from a known yield curve for successive points in time.

A "Bund" is a bond issued by the German government.

"Capital charges" are an allocated charge by a financial institution to one of its departments for the use of its capital to run its business.

"Cash flow matching of assets and liabilities" is the act of buying and selling assets and liabilities in such a manner as to achieve offsetting cash flows.

"Cash settlement" is the process in which traders receive or pay the losses or gains on a futures contract on the effective date. Cash settlement is an alternative to the physical delivery of the goods specified in the futures contract.

The "cheapest to deliver bond" (CTD bond) is the bond with the highest yield that is eligible for delivery versus a particular bond futures contract. Since the short seller of a bond futures contract has the option to deliver one of several bonds on the effective date, he or she will, of course, choose the CTD bond.

A "clean function" is a bond valuation which excludes accrued interest.

The "clean price" is the price of a bond, excluding accrued interest.

A "clearing agent" or a "clearinghouse" is a type of exchange where transactions between brokers are executed.

"Coherent credit" is an institution(s) or group thereof, whose credit standing is easily understood.

A "contract factor" is the portion of the payments of a bond that remain.

A "contract specification" is the exact parameters (including pricing models and inputs, if any) of any futures contract.

"Corporate spreads" is an imprecise term used to summarize the yield difference between investment-grade corporate bonds and their relevant sovereign debt instruments.

"Corporate yield spreads" are the difference in yields between two corporate bonds.

A "counterparty" is one of two parties to an agreement. If two parties agree to something, they are both a counterparty to the agreement, and they may both be collectively referred to as the counterparties to the agreement. Note that the terms agreement and contract are used synonymously in this document.

A "coupon" is a statement of interest owed that may be detached from a bond and separately redeemed at a specified time.

A "coupon bond" is a bond with attached interest payments that may be detached and separately redeemed at a specified time in order to receive payments. If a 10 year bond paying a 6% coupon has a face value of $100, a person who purchases that bond when it issues receives $6 a year at the end of years 1 through 9 and $106 at the end of year 10 when the bond matures.

"Coverage" generally relates to the amount/quantity of time spent with a customer by a salesman.

"Coverage across the swap yield curve" refers to a sufficient number of relevant bonds used as a reference point for defining a swap curve, or vice versa.

A "deutschmark" (DM) or German Mark is a German monetary unit.

"Discount factors" are numbers derived from a zero coupon curve that are used to determine the present value of one or more cash flows. Thus, the discount factor $d_i$, is the present value of $1 received in the future at time i.

The "discount rate" is the rate used to calculate the present value of future cash flows. Typically, the discount rate accounts for at least the interest that could be obtained in a relatively risk free investment, such as a Treasury bill.

The "effective date" is the date and time at which parties have previously agreed to cash settle a futures contract.

"Equilibrium zero rates" are zero rates derived from the midpoint between bid and asked quotes for a yield curve.

An "equivalent risk weighted amount of IRSs" is an amount of IRSS, calculated by using duration or the dollar value of a basis point, sufficient to offset the risk of a particular bond.

"Euro exposure" is a measure of interest rate risk in the euro currency.

The "European Interbank Offered Rate" (EURIBOR) is a short term interest rate at which banks are willing to lend funds to other banks in the interbank market. EURIBOR interest rates are determined by a group of banks located in Europe.

An "exchange" is an organization that brings together buyers and sellers of particular assets. Typically, the exchange makes rules that govern participation and trading.

To "facilitate larger gross positions" is to allow an institution to increase the size of its outstanding positions.

"FedWire" is the wire used to transfer funds between member banks.

"For value" means at current market value of a particular instrument.

"Forward interest rates" are the interest rates fixed today on loans to be made at corresponding future dates. Forward interest rates are used to determine the NPV of an IRS.

The "front month contract" is the contract which is delivered next.

The "front month effective date" is the next effective date.

A "future" is a standardized asset that is bought or sold, respectively, for future acceptance or delivery.

A "future time period" is a date and time that has not yet occurred.

A "futures contract" is an agreement to buy or sell an asset on a future date at a price that is fixed today.

A "futures exchange" is an organization that brings together buyers and sellers of futures contracts.

The "futures price" of an asset is the price of an asset today for delivery in the future.

"Global credit spreads" is an imprecise term used to summarize the yield difference between sovereign and non-sovereign credits worldwide, perhaps best captured by the TED spread (Treasury-Eurodollar spread).

"Headroom" is that part of a credit line that remains unused.

"To hedge" is to invest in a first asset to reduce the risk associated with a second asset. Generally, the value of the first and second assets are related inversely, so that when the value of the first asset decreases, the value of the second assets increases, and vice versa. A perfect hedge results when the two sides of a hedge move together in exactly the same proportion.

A "hedge ratio" or "delta" is the number of units of an asset needed to hedge one unit of a liability.

A "homogeneous data source" is a source, such as the British Bankers Association members, used to poll various interest rates.

The "IMM effective dates" or "IMM value dates" are the effective dates for cash futures traded on the IMM. The IMM effective dates occur 2 days after the IMM futures expiration dates.

The "implied zero curve" is a zero coupon curve derived from a coupon or swap curve.

The "International Money Market" (IMM) is the financial futures market within the Chicago Mercantile Exchange.

An "inter-dealer broker" is a entity that matches buyers with sellers. The inter-dealer broker takes no risk.

The "ISDA Benchmark Swaps Rate fixing" is a set of forward interest rates for various time periods, as determined by the International Swap Dealers Association.

"Knot points" are key points, such as the 2, 5, 10 and year points, on a yield curve.

The "London Interbank Offered Rate" (LIBOR) is a short term interest rate at which banks are willing to lend funds to other banks in the interbank market. LIBOR interest rates are determined by a group of banks located in London.

"Long an autoroll contract" is a position wherein an entity owns a contract with an autoroll feature.

A "long position" is a position which has been purchased for value, as opposed to a position which has been sold.

"Macro credit shocks" are credit shocks having large enough to effect the international economy, for example, the shock created on Aug. 17, 1998 by Russia's default on its government debt.

"Margin" is the amount of money that an exchange requires as deposit in order for a dealer to maintain an account.

"Margining" is the practice of maintaining a minimum margin with an exchange. For example, if the account of the first dealer 2 has decreased by $10,000 from the previous time period in which margining occurred, the dealer 2 pays the entity that oversees trading $10,000. For most futures contracts, margining occurs daily after the close of trading because the contracts are marked-to-market.

"Marking to market" is the practice of calculating the profits and losses on a contract at the end of each day and settling up between the exchange and the dealers. Most, if not all, futures contracts are marked-to-market. Marking to market is also called daily settlement.

"Maturity" is the date and time at which the obligation represented by a bond terminates, i.e., the time at which the borrower makes the last payment to the lender. For example, a 10 year bond issued today matures 10 years from today.

"Medium term interbank rates" are interest rates charged by AA banks on intermediate term (2–7 years) debt instruments.

The "net preset value" (NPV) of an investment is the sum of the present value of all cash flows resulting from an investment.

"Netting" is the act of offsetting credit exposure between financial institutions.

Netting is also the process by which multiple obligations between parties are offset against one another to reduce (and minimize, if possible) the number of transactions required to fulfill the multiple obligations. For example, referring to FIG. 2, if the first dealer 2 owes the second dealer 8 $100, and the third dealer 8 owes the first dealer 2 $100, both obligations are netted by a single payment of $100 from the third dealer 10 to the second dealer 8.

Netting between more than two counterparties is extremely difficult in the current IRS market because each IRS is unique, i.e., there is no pricing transparency in the current IRS market.

"Non-sovereign debt" is any debt instrument that is not a direct obligation of a sovereign country.

The "off date" is the date on which a repo transaction terminates.

The "on date" is the date on which a repo transaction begins.

An "on the run bond" is the most recently issued government bond in a particular maturity range.

"Optionality" is the opportunity to select one of several different deliverable bonds—typically, the cheapest to deliver bond.

The "outright Treasury market" is the over-the-counter market for Treasury securities.

"Over-the-counter" (OTC) is an informal market that does not involve a futures exchange.

"To pay fixed" means to pay a fixed interest rate, usually as part of an interest rate swap.

The "present value" (PV) is the value of a future sum of money today, based on a particular discount rate.

"Quality credit spreads" is an imprecise term used to summarize the yield difference between high-grade bonds and their relevant sovereign debt instruments.

The "repo rate" is the interest rate applicable to principal amount loaned as a result of a repurchase agreement.

A "repurchase agreement" or "repo" is a short-term loan agreement by which one party sells an asset to another party, but promises to buy back the asset at a specified time.

The "reset term" is the amount of time between interest rate resets.

A "reverse repo" or a "reverse repurchase agreement" is a short-term loan agreement by which one party buys an asset from another party, but promises to sell back the asset at a specified time.

"Selling against the swap position" is the act of offsetting the risk in a particular swap position by selling an asset or another swap.

"Selling short" is the process of making a short sale.

A "short sale" is the sale of an asset that an investor does not own. The investor is obligated to buy the same amount of the asset that was sold short at a later date.

"Shorting" is the act of selling an asset which one does not own at the time of sale.

A "skip-day" is a reference to a settlement date which is 2 business days following the trade date.

The "spot price" or "current price" is the price of an asset for immediate delivery.

A "strike price" is the price at which an option may be exercised.

"Stub calculations" are interest calculations relating to the period of time, either before or after the first or last IMM date, respectively, for an IRS.

A "surety bond" is an insurance policy written to enhance the credit standing of a particular asset or institution.

"Swap books" are the combined swap positions of a particular swap dealer.

A "swap dealer" is usually a global bank which is a "price maker" for IRSs.

The "three month LIBOR rate" is the LIBOR rate for a three month loan. If a counterparty to an IRS pays floating interest based on the three month LIBOR rate, that counterparty makes an interest payment every three months, the amount of which is determined by multiplying the then current three month LIBOR rate by the notional amount.

The "Tokyo Interbank Offered Rate" (TIBOR) is a short term interest rate at which banks are willing to lend funds to other banks in the interbank market. TIBOR interest rates are determined by a group of banks located in Tokyo, Japan.

"Trading desks" are the place where traders send and receive information and execute trades.

A "transparent" price describes a price derived from standardized terms and a single pricing model that is generally applicable to all circumstances. Conventional, IRSs do not have transparent prices because each IRS is the unique result of a particular contract between two counterparties.

A "Treasury" is a debt issued by the U.S. government. "Treasury bills" mature in less than a year, "Treasury notes" mature from one year to under 10 years, and "Treasury bonds" take 10 or more years to mature.

"Treasury accrued interest" is the accrued interest on a Treasury bond for a period of time.

To "Treasury hedge" is to use Treasuries to offset the interest rate risk of another security.

A "yield" is a profit expressed as a percentage of the investment made to achieve that profit. If a $100 investment pays $106 in a year, the annual yield is 6%.

A "yield curve" is the relationship between future interest rates and time. A graph showing the interest yield of securities displaying the same characteristics as government securities is known as a par coupon yield curve. The U.S. Treasury yield curve is an example of a par coupon yield curve.

The "yield spread" is the difference in yield between two fixed income instruments.

A "zero-coupon bond" does not pay interest at periodic intervals; rather, it is issued at a discount from its par (or face) value and is redeemed at par. For example, a bond that costs $60, pays no interest, but is redeemable for $100 in 20 years, is a zero-coupon bond.

The "zero coupon discount factor" is the discount factor for a zero coupon bond.

The "zero-coupon rate" is the yield on a zero-coupon bond. All coupon bonds has an equivalent zero-coupon rate that is equal to the yield of a zero coupon bond having an NPV equal to the coupon bond.

The "zero-coupon yield curve" or "zero coupon curve" is a graph or relationship of the internal rate of return of zero-coupon bonds over a range of maturities.

"Zero rates" are zero coupon rates, usually derived from a par coupon curve, that are used to determine discount factors.

Appendix A

1) Dirty Price =
    Summ(PV's) =
        MasterInterp(DiscountTerms,DiscountFactors,Cashflow Date,InterpType)
            Discount Terms =
            afollowing(DATE(YEAR(SwapSettle),MONTH(SwapSettle)+12*$B21,DAY
            (SwapSettle)))
            Discount Factors =
            ZeroDFplain (factor, swap rate)
            Cashflow Date =
            LFBDelivery Date + Cashflow Period
2) Implied Futures Price (IFP) =
    Dirty Price / MasterInterp(DiscountTerms,DiscountFactors,LFBDelivery,InterpType)
3) Implied Financing Rate =
    IF (LFBDelivery=Swapsettle,0,(IFP / Dirty Price-1)*360/(LFBDelivery-SwapSettle))
4) Implied YTM/ par swap rate at expiration =
    YieldToMaturity(IFP, LFBDelivery, cashflow dates , NotionlCoupon, Accrual
    Factors , LFBMaturity)
        Accrual Factors =
        accruals(cahflow period, previous cashflow date, current cashflow date)
5) Implied Spot =
    YieldToMaturity(DirtyPrice,SwapSettle,cashflow dates,NotionlCoupon,Accrual
    Factors,LFBMaturity)
6) Delta Vector (Change in IFP) =
    100*ABS(SUM($Q$19:$Q$28)-SUM($0$19:$0$28))/2
7) IFP sensitivity to 1 basis point implied yield shift =
    50*ABS((DirtyPrice(Implied YTM-0.0001,NotionlCoupon,cashflow
    dates,LFBDelivery,accrual factor,LFBMaturity)-DirtyPrice(Implied YTM
    +0.0001,NotionlCoupon,accrual factors,LFBDelivery,accrual factors,LFBMaturity)))
8) Dirty Price sensitivity to 1 basis point spot YTM shift =
    =50*ABS((DirtyPrice(Implied Spot YTM-0.0001,NotionlCoupon,CashFlow
    Dates,SwapSettle,Accrual Factors,LFBMaturity)-DirtyPrice(Implied Spot YTM
    +0.0001,NotionlCoupon,cashflow dates,SwapSettle,Accrual Factors,LFBMaturity)))

What is claimed is:

1. A computer implemented method of trading, comprising the steps of:

trading a standardized contract obligating a buyer and a seller to settle the contract based on a price of the contract at a first effective date, through an exchange that guarantees payment to the buyer of any amount owed to the buyer from the seller as a result of the contract and that guarantees payment to the seller of any amount owed to the seller from the buyer as a result of the contract; and determining the price of the contract based on preselected notional cash flows discounted by an interest rate swap curve obtained from a preselected swap rate source.

2. The method of claim 1, further comprising the step of:
selecting the swap rate source from a floating rate index selected from the group consisting of LIBOR, EURIBOR, and TIBOR.

3. The method of claim 1, wherein the exchange is a futures exchange and the trading step comprises the step of:
trading the contract through the futures exchange in an exchange-based trading system.

4. The method of claim 1, wherein the exchange is a clearing agent and the trading step comprises the step of:
trading the contract through the clearing agent in an over-the-counter trading system.

5. The method of claim 1, wherein the trading step comprises the step of:
transmitting trade data between the buyer and the exchange and between the seller and the exchange via a system of networked computers, said trade data including information relating to the contract.

6. The method of claim 5, wherein said system of networked computers is a wide area network and the transmitting step comprises the step of:
transmitting trade data between the buyer and the exchange and between the seller and the exchange via the wide area network, said trade data including information relating to the contract.

7. The method of claim 6, wherein said wide area network is the Internet and the transmitting step comprises the step of:
transmitting trade data between the buyer and the exchange and between the seller and the exchange via the Internet, said trade data including information relating to the contract.

8. The method of claim 1, further comprising the step of:
automatically rolling the contract over after the first effective date to a second effective date at which said buyer and seller are obligated to settle based on the price of the contract at the second effective date.

9. The method of claim 1, wherein said determining step comprises the step of:
determining the price of the contract based on a preselected government bond from which the preselected notional cash flows are derived, said government bond having a fixed coupon rate and a face value that provide the notional cash flows.

10. The method of claim 1, wherein the determining step comprises the steps of:
generating a zero coupon curve based on the interest rate swap curve;
generating discount factors corresponding to time periods in which respective of said notional cash flows occur, based on the zero coupon curve; and
multiplying the discount factors by each corresponding notional cash flow.

11. The method of claim 1, wherein the determining step comprises the step of:

determining the price of the contract at the first effective date;

and wherein the method further comprises:

settling the contract on the first effective date based on the price of the contract determined at the first effective date.

12. The method of claim 1, wherein the determining step comprises the step of:

determining the price of the contract daily at the close of trading;

and wherein the method further comprises:

settling daily based on the price determined at the close of trading.

13. A computer implemented method of trading, comprising the steps of:

trading an option to trade a standardized contract at a specified strike price by a specified date, said contract obligating a buyer and a seller to settle the contract based on a price of the contract at a first effective date, through an exchange that guarantees payment to the buyer of any amount owed to the buyer from the seller as a result of the contract and that guarantees payment to the seller of any amount owed to the seller from the buyer as a result of the contract;

determining the price of the contract based on preselected notional cash flows discounted by an interest rate swap curve obtained from a preselected swap rate source; and settling the option based on the difference between the determined price of the contract and the specified strike price.

14. A computer implemented system for trading, comprising:

means for trading a standardized contract obligating a buyer and a seller to settle the contract based on a price of the contract at a first effective date, through an exchange that guarantees payment to the buyer of any amount owed to the buyer from the seller as a result of the contract and that guarantees payment to the seller of any amount owed to the seller from the buyer as a result of the contract; and means for determining the price of the contract based on preselected notional cash flows discounted by an interest rate swap curve obtained from a preselected swap rate source.

15. The system of claim 14, further comprising:

means for receiving the swap rate source from a floating rate index selected from the group consisting of LIBOR, EURIBOR, and TIBOR.

16. The system of claim 14, wherein the exchange is a futures exchange and the means for trading comprises:

means for trading the contract through the futures exchange in an exchange-based trading system.

17. The system of claim 14, wherein the exchange is a clearing agent and the means for trading comprises:

means for trading the contract through the clearing agent in an over-the-counter trading system.

18. The system of claim 14, wherein the means for trading comprises:

means for transmitting trade data between the buyer and the exchange and between the seller and the exchange via a system of networked computers, said trade data including information relating to the contract.

19. The method of claim 18, wherein said system of networked computers is a wide area network and the means for transmitting trade data via the system of networked computers comprises:

means for transmitting trade data between the buyer and the exchange and between the seller and the exchange via the wide area network, said trade data including information relating to the contract.

20. The system of claim 19, wherein said wide area network is the Internet and the means for transmitting trade data via the wide area network comprises:

means for transmitting trade data between the buyer and the exchange and between the seller and the exchange via the Internet, said trade data including information relating to the contract.

21. The system of claim 14, further comprising:

means for automatically rolling the contract over after the first effective date to a second effective date at which said buyer and seller are obligated to settle based on the price of the contract at the second effective date.

22. The system of claim 14, wherein said means for determining comprises:

means for determining the price of the contract based on a preselected government bond from which the preselected notional cash flows are derived, said government bond having a fixed coupon rate and a face value that provide the notional cash flows.

23. The system of claim 14, wherein said means for determining comprises:

means for generating a zero coupon curve based on the interest rate swap curve;

means for generating discount factors corresponding to time periods in which respective of said notional cash flows occur, based on the zero coupon curve; and means for multiplying the discount factors by each corresponding notional cash flow.

24. The system of claim 14, wherein the means for determining comprises:

means for determining the price of the contract at the first effective date;

and wherein the system further comprises:

means for settling the contract on the first effective date based on the price of the contract determined at the first effective date.

25. The system of claim 14, wherein the means for determining comprises:

means for determining the price of the contract daily at the close of trading;

and wherein the system further comprises:

means for settling daily based on the price determined at the close of trading.

26. A computer implemented system for trading, comprising:

means for trading an option to trade a standardized contract at a specified strike price by a specified date, said contract obligating a buyer and a seller to settle the contract based on a price of the contract at a first effective date, through an exchange that guarantees payment to the buyer of any amount owed to the buyer from the seller as a result of the contract and that guarantees payment to the seller of any amount owed to the seller from the buyer as a result of the contract;

means for determining the price of the contract based on preselected notional cash flows discounted by an interest rate swap curve obtained from a preselected swap rate source; and means for settling the option based on the difference between the determined price of the contract and the specified strike price.

27. A computer readable medium containing program instructions for execution on a computer system, which when executed by a computer, cause the computer to perform method steps for trading a contract, said method comprising the steps of:

trading a standardized contract obligating a buyer and a seller to settle the contract based on a price of the contract at a first effective date, through an exchange that guarantees payment to the buyer of any amount owed to the buyer from the seller as a result of the contract and that guarantees payment to the seller of any amount owed to the seller from the buyer as a result of the contract; and determining the price of the contract based on preselected notional cash flows discounted by an interest rate swap curve obtained from a preselected swap rate source.

28. The computer readable medium of claim 27, further comprising computer-executable instructions for causing the computer to perform the step of:

receiving the swap rate source from a floating rate index selected from the group consisting of LIBOR, EURIBOR, and TIBOR.

29. The computer readable medium of claim 27, wherein the exchange is a futures exchange and the trading step comprises the step of:

trading the contract through the futures exchange in an exchange-based trading system.

30. The computer readable medium of claim 27, wherein the exchange is a clearing agent and the trading step comprises the step of:

trading the contract through the clearing agent in an over-the-counter trading system.

31. The computer readable medium claim 27, wherein the trading step comprises the step of:

transmitting trade data between the buyer and the exchange and between the seller and the exchange via a system of networked computers, said trade data including information relating to the contract.

32. The computer readable medium of claim 31, wherein said system of networked computers is a wide area network and the transmitting step comprises the step of:

transmitting trade data between the buyer and the exchange and between the seller and the exchange via the wide area network, said trade data including information relating to the contract.

33. The computer readable medium of claim 32, wherein said wide area network is the Internet and the transmitting step comprises the step of:

transmitting trade data between the buyer and the exchange and between the seller and the exchange via the Internet, said trade data including information relating to the contract.

34. The computer readable medium of claim 27, further comprising program instructions for causing the computer to perform the step of:

automatically rolling the contract over after the first effective date to a second effective date at which said buyer and seller are obligated to settle based on the price of the contract at the second effective date.

35. The computer readable medium of claim 27, wherein said determining step comprises the step of:

determining the price of the contract based on a preselected government bond from which the preselected notional cash flows are derived, said government bond having a fixed coupon rate and a face value that provide the notional cash flows.

36. The computer readable medium of claim 27, wherein the determining step comprises the steps of:

generating a zero coupon curve based on the interest rate swap curve;

generating discount factors corresponding to time periods in which respective of said notional cash flows occur, based on the zero coupon curve; and multiplying the discount factors by each corresponding notional cash flow.

37. The computer readable medium of claim 27, wherein the determining step comprises the step of:

determining the price of the contract at the first effective date;

and wherein the computer readable medium further comprises computer-executable instructions for causing the computer to perform the step of:

settling the contract on the first effective date based on the price of the contract determined at the first effective date.

38. The computer readable medium of claim 27, wherein the determining step comprises the step of:

determining the price of the contract daily at the close of trading;

and wherein the computer readable medium further comprises computer-executable instructions for causing the computer to perform the step of:

settling daily based on the price determined at the close of trading.

39. A computer readable medium containing program instructions for execution on a computer system, which when executed by a computer, cause the computer to perform method steps for trading a contract, said method comprising the steps of:

trading an option to trade a standardized contract at a specified strike price by a specified date, said contract obligating a buyer and a seller to settle the contract based on a price of the contract at a first effective date, through an exchange that guarantees payment to the buyer of any amount owed to the buyer from the seller as a result of the contract and that guarantees payment to the seller of any amount owed to the seller from the buyer as a result of the contract;

determining the price of the contract based on preselected notional cash flows discounted by an interest rate swap curve obtained from a preselected swap rate source; and settling the option based on the difference between the determined price of the contract and the specified strike price.

* * * * *